(12) United States Patent
Beshai

(10) Patent No.: US 8,139,570 B2
(45) Date of Patent: Mar. 20, 2012

(54) BALANCED BUFFERLESS SWITCH

(75) Inventor: Maged E. Beshai, Stittsville (CA)

(73) Assignee: Rockstar Bidco LP, New York, NY (US)

( * ) Notice: Subject to any disclaimer, the term of this patent is extended or adjusted under 35 U.S.C. 154(b) by 79 days.

(21) Appl. No.: 12/427,067

(22) Filed: Apr. 21, 2009

(65) Prior Publication Data

US 2009/0214208 A1  Aug. 27, 2009

Related U.S. Application Data

(62) Division of application No. 11/010,742, filed on Dec. 13, 2004, now Pat. No. 7,539,181.

(51) Int. Cl.
*H04Q 11/00* (2006.01)

(52) U.S. Cl. .......... 370/380; 370/388; 370/427; 398/50; 398/56

(58) Field of Classification Search .................. 370/380, 370/352, 353, 368–378, 386–388, 398, 413, 370/395.71, 427
See application file for complete search history.

(56) References Cited

U.S. PATENT DOCUMENTS

| | | | | |
|---|---|---|---|---|
| 5,168,492 A | * | 12/1992 | Beshai et al. | 370/353 |
| 5,544,168 A | * | 8/1996 | Jeffrey et al. | 370/370 |
| 5,745,486 A | * | 4/1998 | Beshai et al. | 370/395.71 |
| 7,450,845 B2 | * | 11/2008 | Beshai et al. | 398/47 |
| 7,539,181 B2 | * | 5/2009 | Beshai | 370/369 |
| 7,567,556 B2 | * | 7/2009 | Beshai | 370/398 |
| 7,630,362 B1 | * | 12/2009 | Jeffrey et al. | 370/387 |
| 7,660,300 B2 | * | 2/2010 | Beshai | 370/380 |
| 2002/0039362 A1 | * | 4/2002 | Fisher et al. | 370/387 |
| 2002/0075540 A1 | * | 6/2002 | Munter | 398/49 |
| 2002/0085491 A1 | * | 7/2002 | Beshai et al. | 370/230 |
| 2003/0185205 A1 | * | 10/2003 | Beshai | 370/370 |
| 2003/0193937 A1 | * | 10/2003 | Beshai et al. | 370/372 |
| 2004/0037558 A1 | * | 2/2004 | Beshai | 398/57 |
| 2004/0141494 A1 | * | 7/2004 | Beshai et al. | 370/352 |
| 2005/0249201 A1 | * | 11/2005 | Beshai | 370/369 |

* cited by examiner

*Primary Examiner* — Jeffrey M Rutkowski

(74) *Attorney, Agent, or Firm* — Anderson Gorecki & Manaras LLP

(57) ABSTRACT

A high capacity distributed switching system comprises electronic edge nodes connected to a balanced bufferless switch which may be electronic or optical. The balanced bufferless switch comprises a balanced connector and a switch fabric. The balanced connector comprises an array of temporally cyclic rotator units having graduated rotation shifts and each having a prime number of output ports. The switch fabric may be a mesh interconnection of switch modules. Due to the use of the balanced connector, establishing a path through the switch fabric requires at most a second-order time-slot matching process for a high proportion of connection requests with a much reduced need for a third-order time-slot matching process required in a conventional mesh structure.

18 Claims, 27 Drawing Sheets

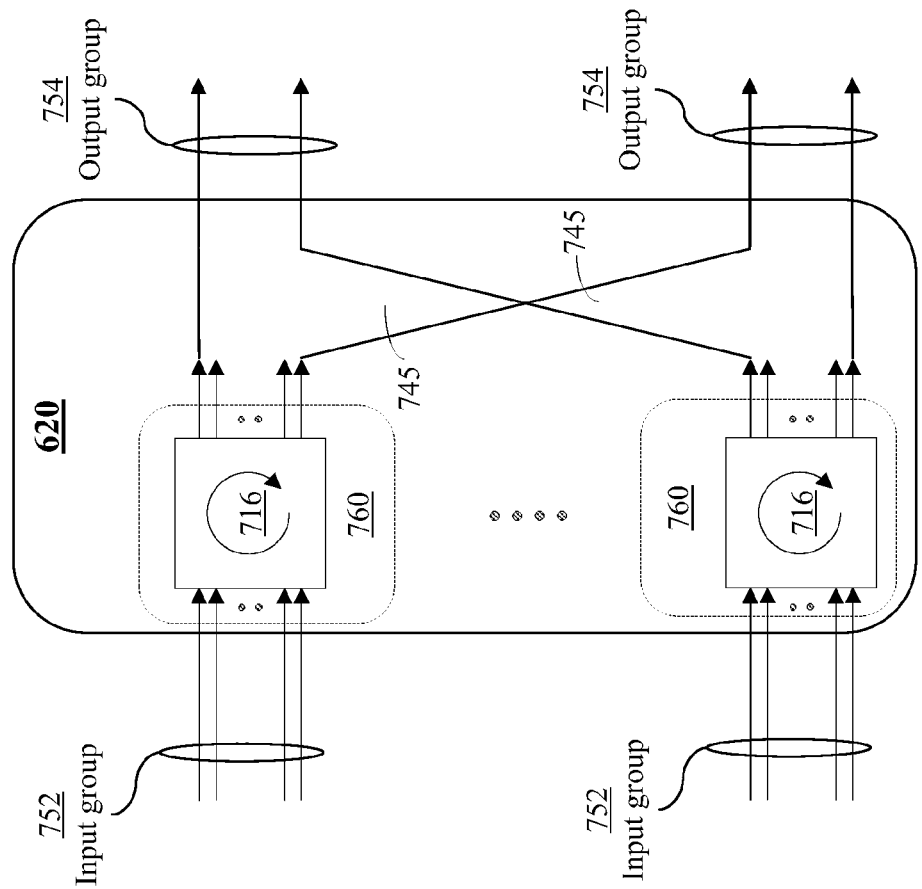
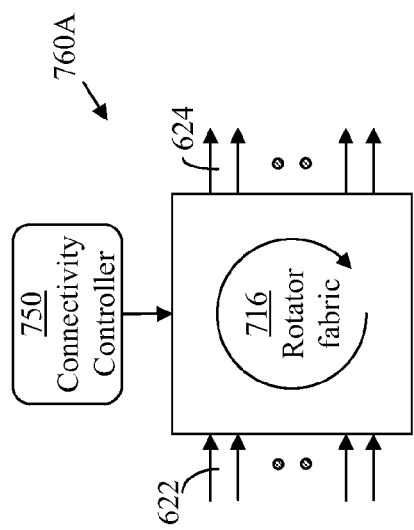
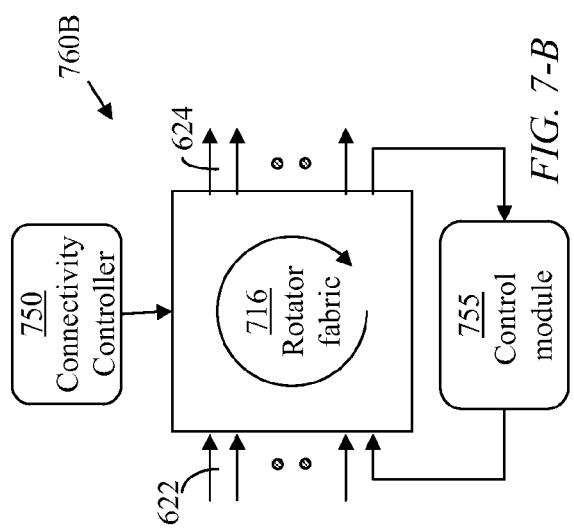
FIG. 7-C
FIG. 7-A
FIG. 7-B

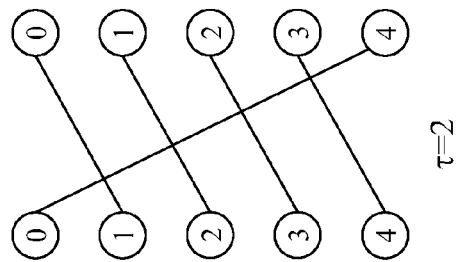
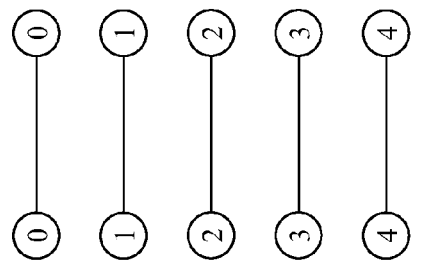
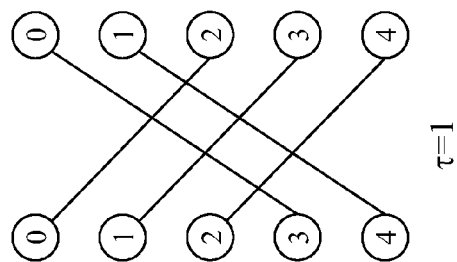
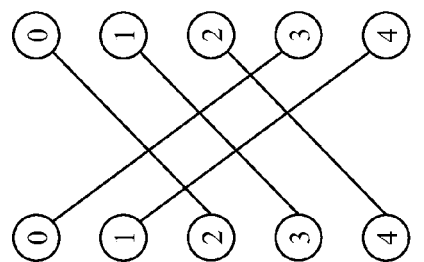
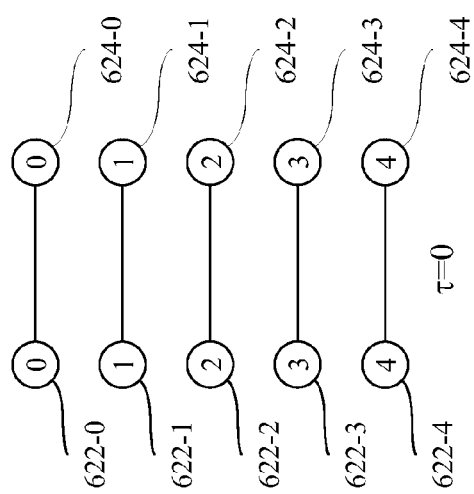
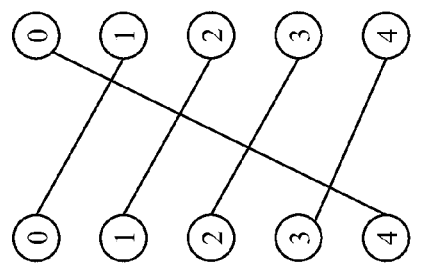
*Number of output ports J = 5, Rotation shift σ = 2*
*FIG. 12*

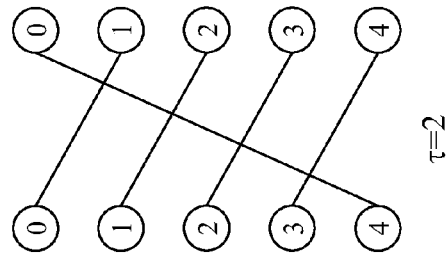
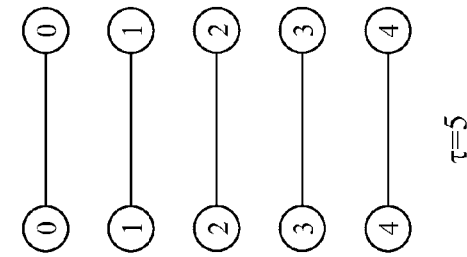
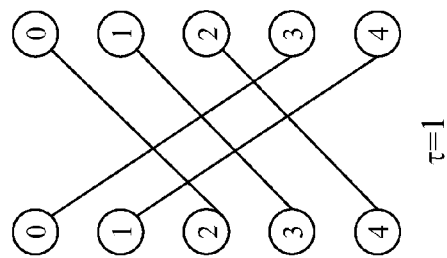
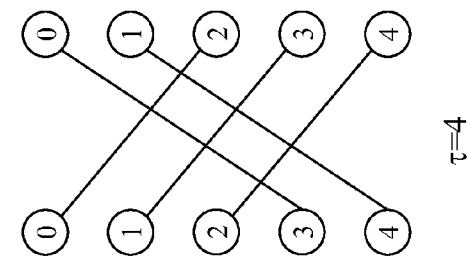
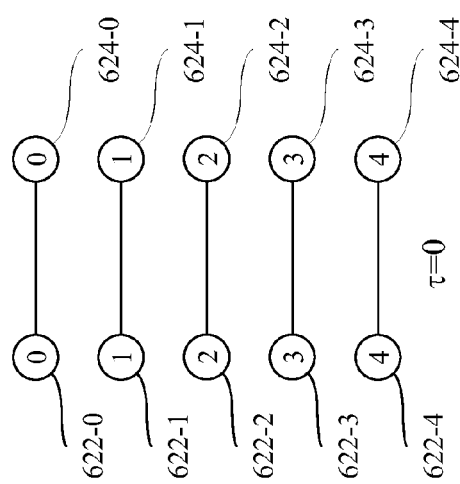
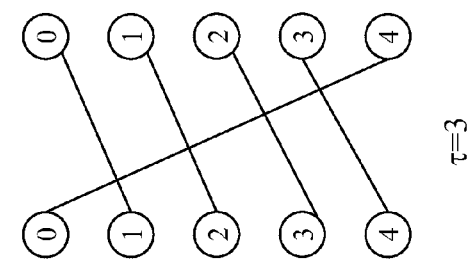
*FIG. 13*
*Number of output ports J = 5, Rotation shift σ = 3*

FIG. 17

|  | τ=0 | τ=1 | τ=2 | τ=3 | τ=4 |
|---|---|---|---|---|---|
|  | a0 b0 c0 d0 e0 | a0 b1 c2 d3 e4 | a0 b2 c4 d1 e3 | a0 b3 c1 d4 e2 | a0 b4 c3 d2 e1 |
|  | a1 b1 c1 d1 e1 | a1 b2 c3 d4 e0 | a1 b3 c0 d2 e4 | a1 b4 c2 d0 e3 | a1 b0 c4 d3 e2 |
|  | a2 b2 c2 d2 e2 | a2 b3 c4 d0 e1 | a2 b4 c1 d3 e0 | a2 b0 c3 d1 e4 | a2 b1 c0 d4 e3 |
|  | a3 b3 c3 d3 e3 | a3 b4 c0 d1 e2 | a3 b0 c2 d4 e1 | a3 b1 c4 d2 e0 | a3 b2 c1 d0 e4 |
|  | a4 b4 c4 d4 e4 | a4 b0 c1 d2 e3 | a4 b1 c3 d0 e2 | a4 b2 c0 d3 e1 | a4 b3 c2 d1 e0 |

↙ 1702   ↙ 1704

|  | τ=0 | τ=1 | τ=2 | τ=3 | τ=4 |
|---|---|---|---|---|---|
|  | a0 b0 c0 d0 e0 | a0 b1 c2 d3 e4 | a0 b2 c4 d1 e3 | a0 b3 c1 d4 e2 | a0 b4 c3 d2 e1 |
|  | a1 b1 c1 d1 e1 | a1 b2 c3 d4 e0 | a1 b3 c0 d2 e4 | a1 b4 c2 d0 e3 | a1 b0 c4 d3 e2 |
|  | a2 b2 d2 e2 c2 | a2 b3 c4 d0 e1 | a2 b4 c1 d3 e0 | a2 b0 c3 d1 e4 | a2 b1 c0 d4 e3 |
|  | a3 b3 c3 d3 e3 | a3 b4 c0 d1 e2 | a3 b0 c2 d4 e1 | a3 b1 c4 d2 e0 | a3 b2 c1 d0 e4 |
|  | a4 b4 c4 d4 e4 | a4 b0 c1 d2 e3 | a4 b1 c3 d0 e2 | a4 b2 c0 d3 e1 | a4 b3 c2 d1 e0 |

BALANCED BUFFERLESS SWITCH

CROSS-REFERENCE TO RELATED APPLICATIONS

The Application is a Divisional of U.S. patent application Ser. No. 11/010,742, filed Dec. 13, 2004, now U.S. Pat. No. 7,539,181 entitled BALANCED BUFFERLESS SWITCH, which is incorporated herein by reference.

FIELD OF THE INVENTION

The present invention relates to a high-capacity optical-core switch and its use in a wide-coverage network.

BACKGROUND

Fast-switching high-capacity optical switches are needed to realize an agile optical-core network that may adjust swiftly to changes in desired connectivity between edge nodes. It is known to use an aggregation of switch modules in a multi-stage arrangement to construct a high capacity optical core node using switch modules of smaller sizes.

Applicant's U.S. patent application Ser. No. 10/223,222 filed on Aug. 20, 2002 and titled "Modular High-Capacity Switch" describes a modular optical switch that includes a set of optical switch modules connected in a mesh structure, a master controller for the entire modular switch and a switch-module controller for each of the optical switch modules. The optical switch modules receive optical signals from source edge nodes and transmit optical signals to sink edge nodes. The master controller selects a path, using a simple or compound time-slot matching process, through the mesh of switch modules for each optical signal related to a connection request. The optical switch modules are fast switching, enabling the use of time-sharing schemes such as Time-Division-Multiplexing (TDM), and a master controller of the modular optical core node uses an efficient path-selection process. A hybrid modular switch may include both optical and electronic switch modules, a master controller, and a switch-module controller for each of the switch modules.

The use of a mesh structure where connections between two switch modules may be routed through an intermediate switch module requires internal expansion to compensate for the use of an intermediate switching step.

Scheduling connections in a multi-stage high-capacity switching node comprising fast bufferless switch modules and operating in a time-sharing mode, such as burst-switching mode or conventional time-division multiplexing mode, may require a scheduler of very high throughput. The use of intermediate switching requires a computationally intensive third-order time-slot matching process as described in the aforementioned patent application Ser. No. 10/223,222. While a mesh structure employing intermediate switching is quite efficient, it is still desirable to seek means for further reducing the structural and control complexity of high-capacity modular switching nodes, thus extending their scalability and reducing their cost.

SUMMARY

A bufferless switch includes a space switch fabric coupled with a balanced connector. The bufferless space switch may comprise electronic or photonic switching elements. The balanced connector functions to balance the load of potential traffic provided to the space switch. The balanced connector may include multiple rotator units, or any other suitable load balancing mechanisms. Input buffers at source nodes connecting to the balanced connector hold data queued for transmission through the balanced connector to the bufferless space-switch fabric. The source nodes need not be collocated with the balanced connector.

One advantage of the balanced switch of the present invention is enhanced scalability with high performance. A three-stage bufferless space switch requires a third-order time-slot matching process, and as switch capacity is increased the requisite third-order computations may become excessive. The distributed optical core switch of the present invention mitigates the need for intense computations because the use of a balanced connector enables the use of a second-order time-slot-matching process for a high proportion of connection requests. Consequently, the distributed switch of the present invention provides a more practical time-shared communications switch in which scalability is enhanced and cost is reduced.

The balanced connector has a plurality of input ports and a plurality of output ports. The output ports are grouped into output groups. Each input port receives signals through a buffer, which need not be collocated with the balanced connector. The balanced connector may include at least one rotator unit and a connectivity controller operable to change the connectivity of the input ports to the output ports through at least one rotator unit during successive time intervals so that: during any two successive time intervals each input port connects to output ports in different output groups; during a time frame defined by a predefined number of time intervals, each input port connects to an output port in each output group; and during the time frame, any combination of two input ports connects only once to output ports of the same output group. To realize full connectivity of each input port to each output group, the number of output groups is selected to be a prime number J and the rotator units operate at different rotation shifts with one rotator unit being static, having a rotation shift of zero, and the remaining rotator units operating at graduated rotation shifts ranging from 1 to at most (J−1), a rotation shift being the spatial separation between output ports of a rotator unit to which an input port connects during successive time intervals.

The switch of the invention is may be deployed in a network comprising a plurality of electronic edge nodes, each edge node comprising a source node and a sink node. The switch comprises switch modules with rotating access of each source node to the switch modules and static access of the switch modules to the sink nodes. The edge nodes may function to provide buffering for a bufferless configuration of the switch. A rotating access feature of the invention realizes load balancing by constraining the rotating access so that any two source nodes cannot simultaneously access any switch module of the modular switch more than once during a rotation cycle. This constraint is automatically enforced using a balanced connector that comprises an array of rotator units, each having the same prime number of output ports and operating at graduated rotation shifts. Remote edge nodes, experiencing a significant propagation delay towards a core switch, are time-locked to the core switch.

In accordance with an aspect of the present invention, a balanced connector comprises a plurality of input ports and a plurality of output ports, where the output ports are divided into a number of output groups each output group including at least two output ports. The balanced connector is operable to change the connectivity of the input ports to the output ports during successive time intervals in a time frame having a predefined number of time intervals so that: during any two successive time intervals, each input port connects to output ports in different output groups; during the time frame each input port connects to an output port in each output group; and during the time frame, any combination of two input ports connects only once to output ports of the same output group. To realize the desired connectivity, the number of output groups is selected to be a prime number.

The balanced connector comprises a plurality of rotator units operating at graduated rotation shifts; a rotation shift of a specific rotator unit being the spatial separation between output ports of the specific rotator unit to which an input port connects during successive time intervals, a rotation shift of zero corresponding to a static rotator unit.

In accordance with another aspect of the present invention, a method for switching comprises steps of receiving data on at least one input port of a plurality of input ports of a balanced connector, and balancing the received data with the balanced connector such that data received from each input port of the at least one input port is equitably supplied to a corresponding group of inlet ports of a switch having a plurality of accessible switch modules.

In accordance with a further aspect of the present invention, a method for providing balance to data received at a network switch comprises the steps of: providing the data to a balanced connector having a plurality of input ports, at least one rotator fabric, and a plurality of output ports divided into a number of output groups each output group including at least two output ports; and changing, with a connectivity controller, the connectivity of the input ports to the output ports through the at least one rotator fabric during successive time intervals of a time frame having a predefined number of time intervals. The connectivity is devised so that: during any two successive time intervals, each input port connects to output ports in different output groups; during the time frame, each input port connects to an output port in each output group; and during the time frame, any combination of two input ports connects only once to output ports of the same output group.

BRIEF DESCRIPTION OF THE DRAWINGS

Embodiments of the present invention will be further described with reference to the accompanying exemplary drawings, in which:

FIG. 7A illustrates a rotator unit having a rotator-connectivity controller, in accordance with an embodiment of the present invention;

FIG. 7B illustrates a rotator unit having a rotator-connectivity controller and a control unit of a core controller, in accordance with an embodiment of the present invention;

FIG. 7C illustrates a connector comprising an array of rotator units each having a rotator-connectivity controller, in accordance with an embodiment of the present invention;

FIG. 12 illustrates the connectivity of a rotator unit having a rotation shift of two, in accordance with an embodiment of the present invention;

FIG. 13 illustrates the connectivity of a rotator unit having a rotation shift of three, in accordance with an embodiment of the present invention;

FIG. 17 illustrates connectivity scatter of the balanced connector of FIG. 10;

DETAILED DESCRIPTION

Figure 1:
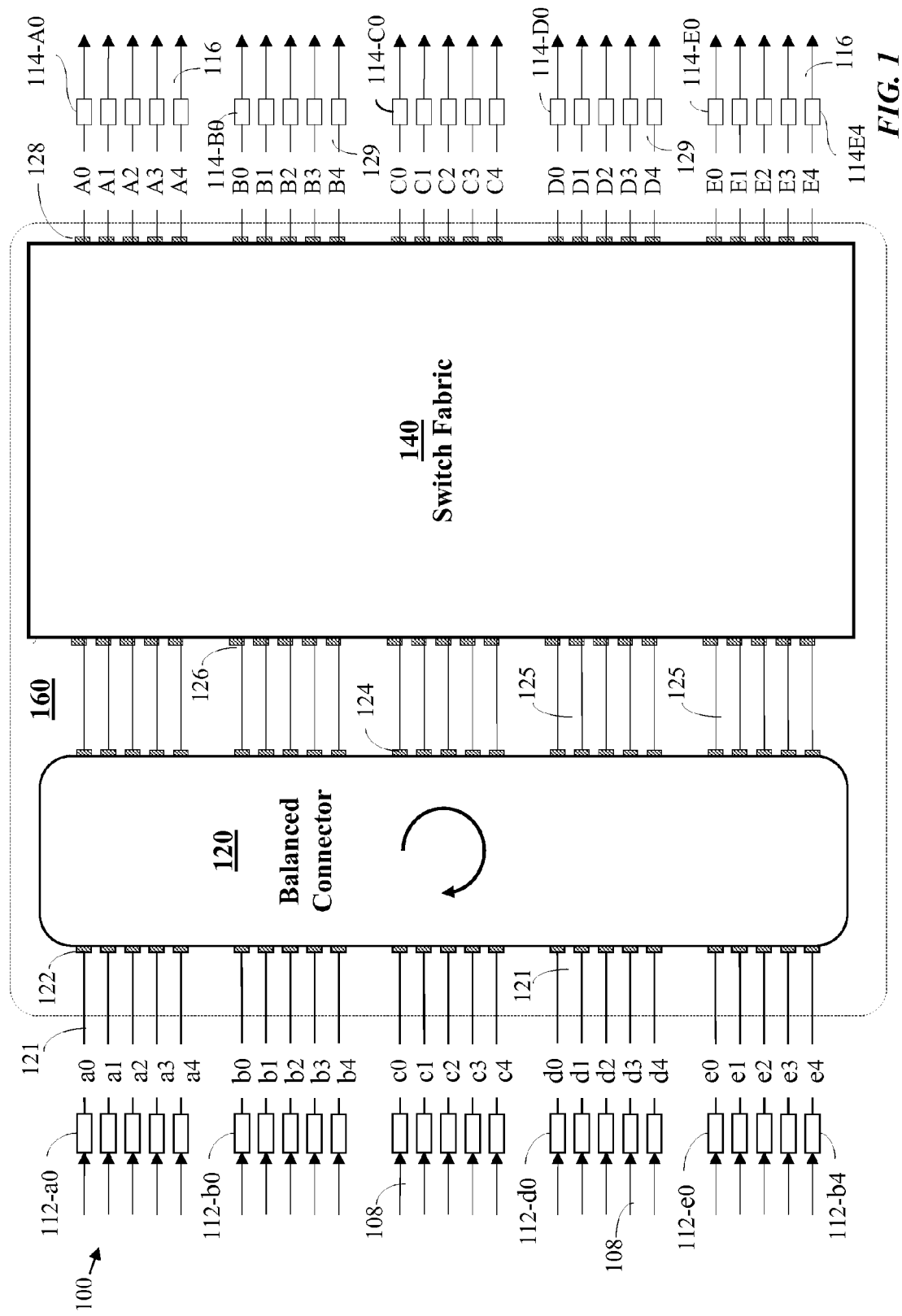
FIG. 1 illustrates a switch comprising a bufferless switch fabric preceded by a balanced connector, in accordance with an embodiment of the present invention.

The terminology used in describing the embodiments of the invention is listed below.

Edge node: A switching node having subtending information sources and sinks and connecting to other nodes is called an edge node. An edge node has two components: a source node and a sink node. An edge node is preferably an electronic node.

Source node: An edge-node component transmitting signals received from information sources to other nodes is called a source node.

Sink node: An edge node component receiving signals from other nodes and delivering the received signals to information sinks is called a sink node.

Core node: A switching node connecting only to other nodes is called a core node. The balanced switch of the present invention may be deployed as a high-capacity core node.

Inbound port: An input port of an edge node receiving signals from external nodes, such as core nodes, is referenced as an inbound port. An inbound port receives signals over "inbound channels".

Outbound port: An output port of an edge node transmitting signals to external nodes, such as core nodes, is referenced as an outbound port. An outbound port transmits signals over "outbound channels".

Inlet port: An input port of a core node connecting to an outbound channel from an outbound port of an edge node is herein called an inlet port.

Outlet port: An output port of a core node transmitting signals directed to an inbound port of an edge node is herein called an outlet port. The edge node receives the signals through inbound channels.

Inward port: An input port of a core node, receiving a channel from another core node, is called an inward port.

Outward port: An output port of a core node, having a channel to another core node, is called an outward port.

Balanced connector: It is a connector having several input ports and several output ports with each input port connecting to each output port in a predetermined temporal order. The balanced connector is, therefore, a time-division-multiplexed device.

Rotator unit: A balanced connector of large dimension, having a prescribed number of input ports and output ports, may comprise several rotator units of smaller dimension, each having fewer input ports (and fewer output ports) than the prescribed number of input ports (and output ports). A balanced connector may, however, be implemented as a single rotator.

Rotation cycle: A rotation cycle is a sequence of input to output connections after which a rotator unit returns to the same connection configuration and begins an identical subsequent sequence. If a rotator comprises multiple rotator units, each rotator unit returns to the same connection configuration after each rotation cycle.

Time frame: The time domain may be divided into successive time periods of equal durations to facilitate event scheduling in a switching node. Herein, a time frame equals the duration of a rotation cycle.

Time slot: The time frame is divided into a predetermined number of time slots with each time slot equal to the time allocated to switch a signal unit (data unit) across an edge node or across a switch module in the core.

Allocable time slot: An allocable time slot is a time slot during which all ports or links traversed by a designated path are free.

Time interval: Herein, a time interval is the time duration required to change the connection configuration of a balanced connector or a rotator unit. A time interval may contain several time slots.

Rotation shift: A rotation shift of a rotator unit, where the output ports are given sequential numbers, is defined as the difference between the sequential numbers of output ports accessed by an input port of the rotator unit during successive time intervals. The difference between successive output ports may also be viewed as a spatial separation of output ports.

Time Locking: Time-locking is a process of time coordination to enable time alignment of signals received at a connecting node. In one realization, a first controller is time-locked to a second controller so that a signal transmitted at an instant of time indicated by a time counter at the first controller arrives at the second controller at the same instant of time as indicated by an identical time counter at the second controller.

First-order matching process: In a first-order matching process, a connection requesting a single time slot or multiple time slots requires each time slot to be free in two corresponding ports.

Compound matching process: In a compound second-order matching process, a connection specifying a single time slot or multiple time slots requires that each time slot be free in three corresponding ports (i.e., traversing two switch modules). In a compound third-order matching process, a connection specifying a single time slot or multiple time slots requires that each time slot be free in four corresponding ports (i.e., traversing three switch modules).

Rotating-Access Switch

FIG. 1 illustrates a distributed switching system 100, in accordance with the present invention, comprising edge nodes and a balanced bufferless switch 160 comprising a balanced connector 120 and a switch fabric 140. The edge nodes may not be collocated with the core switch. Each edge node comprises a source node 112 and a sink node 114 which may share memory and control. Each source node 112 receives traffic from subtending traffic sources (not illustrated) through an incoming channel 108 and each sink node 114 sends traffic to subtending traffic sinks (not illustrated) through an outgoing channel 116. Each source node 112 has a channel 121 to an input port 122 of balanced connector 120 and each output port 128 of switch fabric 140 has a channel 129 to a sink node 114. The output ports 124 of balanced connector 120 have a one-to-one connection to input ports 126 of switch fabric 140 through channels 125. Twenty five edge nodes are illustrated as separate source nodes (112a0 to 112e4), and sink nodes (114A0 to 114E4). The edge nodes are illustrated in the form of five groups to facilitate further illustrations. Signals are switched from source nodes 112 to sink nodes 114 through core switch 160. Balanced connector 120 has 25 inlet ports 122 receiving signals from the source nodes 112 and 25 output ports 124 connecting to the input ports 126 of switch fabric 140. The output ports 128 of the switch fabric 140 have channels 129 to the sink nodes 114.

Figure 2:
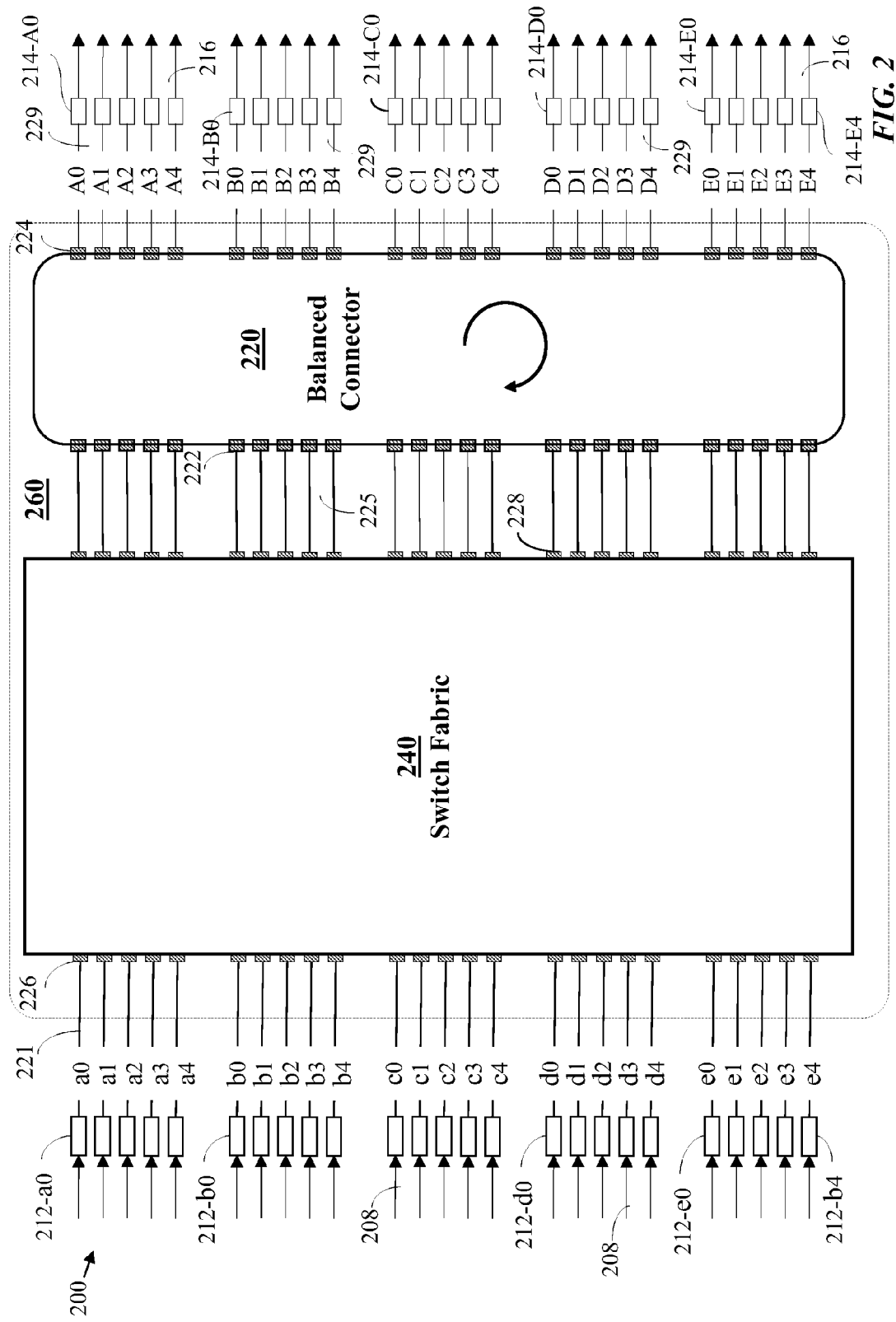
FIG. 2 illustrates a switch comprising a bufferless switch fabric followed by a balanced connector, in accordance with an embodiment of the present invention.

FIG. 2 illustrates a distributed switching system 200, in accordance with the present invention, comprising edge nodes and a balanced bufferless switch 260 comprising a switch fabric 240 followed by a balanced connector 220. Each source node 212 has a channel 221 to an inlet port 226 of switch fabric 240 and each output port 228 of switch fabric 240 has a channel 225 to an input port of balanced connector 220. Each output port 224 of balanced connector 220 has a channel 229 to a sink node 214. The outlet ports 228 of switch fabric 240 have a one-to-one connection to input ports 222 of balanced connector 220.

The use of balanced connector 120 to connect the source nodes 112 to switch fabric 140 results in equitable distribution of the traffic sent by each source node 112 among a number of input ports of the switch fabric 140. If the switch fabric 140 is inherently blocking, the combination of the balanced connector 120 and the switch fabric yields a switch 160 with a significantly reduced blocking. In general, inherently blocking switch fabrics require internal expansion to reduce or eliminate internal blocking and the use of the rotator stage 120 may significantly reduce the required internal expansion to realize a specified performance.

In order to realize fine switching granularity, the space switch fabric 140, whether constructed as a single-stage or a multi-stage switch, may be time shared so that an input port may connect to different output ports during successive time slots.

Basic Multi-Stage Space Switch

A conventional input-buffer switching system comprises an array of source nodes, each having an input buffer, and a space switch. A space switch of large dimension, having a large number of input ports and output ports, is usually implemented as a three-stage switch where each stage comprises an array of space-switch modules of relatively small dimension.

Figure 3:
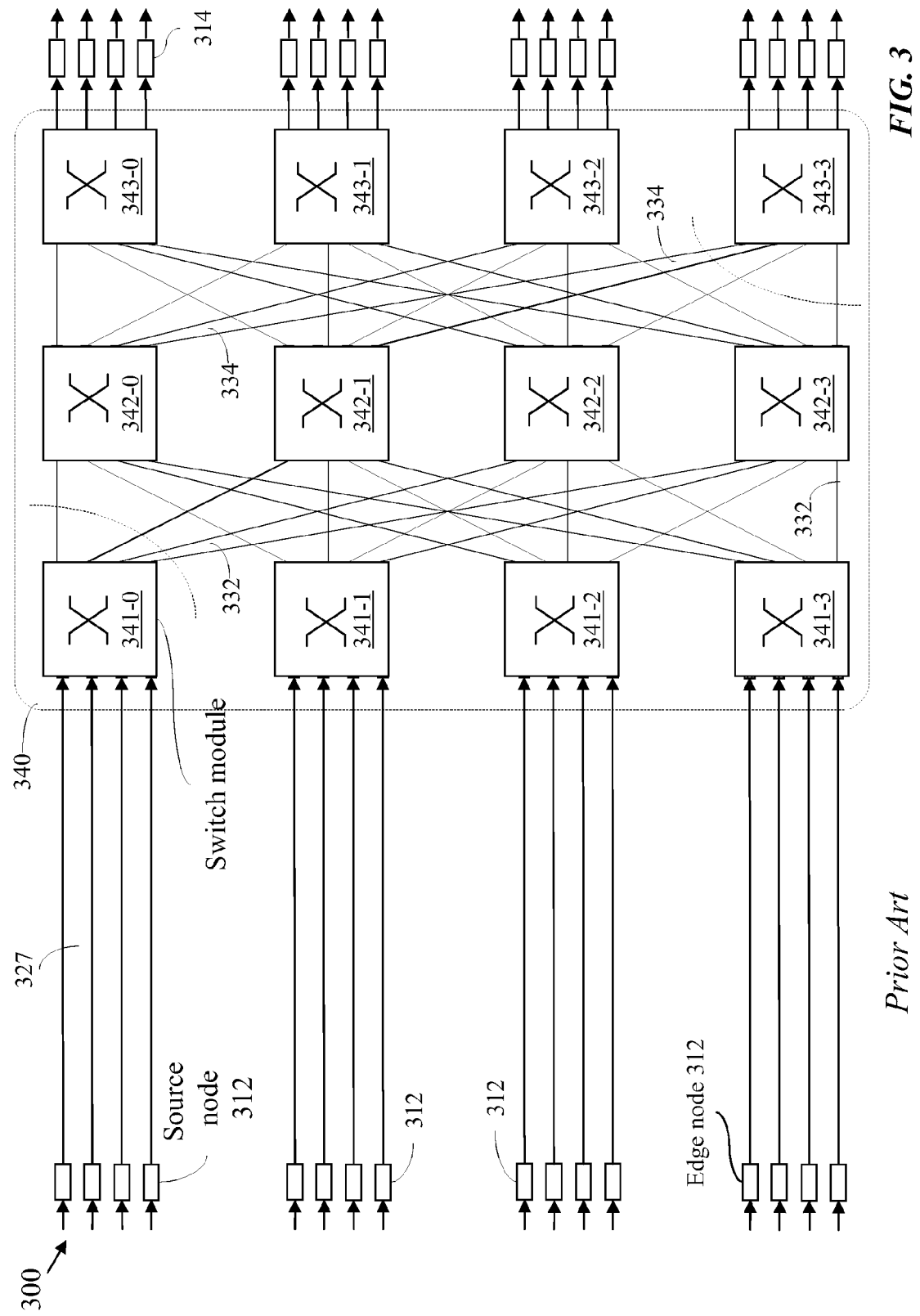
FIG. 3 illustrates a prior-art input-buffer switch using a bufferless three-stage space switch where the input buffers may not be collocated with the three-stage space switch, thus requiring a time-locking process.

FIG. 3 illustrates a conventional input-buffer switching system 300 where the space switch is a three-stage switch comprising three cascaded arrays of switch modules 341, 342, and 343. Each switch module 341 has a channel 332 to each switch module 342 and each switch module 342 has a channel 334 to each switch module 343. When a specific first-stage switch module, 341-0 for example, is operating near capacity, its channels 332 to the middle-stage switch modules 342 would be highly occupied thus rendering a successful time-slot matching for a new connection from switch module 334-0 improbable. Likewise, if a specific third-stage switch module, 343-3 for example, is highly occupied, so would be channels 334 leading to switch module 343-3, resulting in a low probability of a successful time-slot matching for a connection directed to switch module 343-3. A request for a connection from 341-0 to 343-3 may then be rejected even if channels 332 from switch modules 341-1, 341-2, and 341-3 have sufficient vacancy to accommodate the connection. The method of rotating access of the present invention distributes input traffic equitably among the switch modules, thus avoiding localized overload conditions.

A major challenge of a bufferless three-stage space switch is the path setup, which requires a third-order matching process as described in the aforementioned U.S. patent application Ser. No. 10/223,222, the specification of which is incorporated herein by reference.

An input-buffer switching system may be distributed where the source nodes are not necessarily collocated with the core space switch. In a distributed input-buffer switch, edge nodes, each comprising a source node 312 and a sink node 314, may be distributed over a wide geographical area and need, therefore, be time-locked to the space switch in order to enable time-shared switching. The space switch may comprise three interconnected arrays of switch modules 341, 342, and 343. A time-locking process is described in U.S. Pat. No. 6,570,872 issued to Beshai et al. on May 27, 2003 and titled "Self-configuring distributed switch". Time locking, as described in the above US patent, allows a node having a buffer to time lock to another node regardless of distance. The time-locking process in a network having a time-shared core is described in a co-pending and commonly assigned U.S. patent application Ser. No. 10/054,509, titled "Time-coordination in a burst-switching network", filed in the United States Patent Office on Nov. 13, 2001, the specification of which is incorporated herein by reference. Other aspects of the time-locking process are described in a co-pending and commonly assigned U.S. patent application Ser. No. 10/290,314, titled "Hybrid fine-coarse carrier switching", filed in the United States Patent Office on Nov. 8, 2002, the specification of which is incorporated herein by reference.

Figure 4:
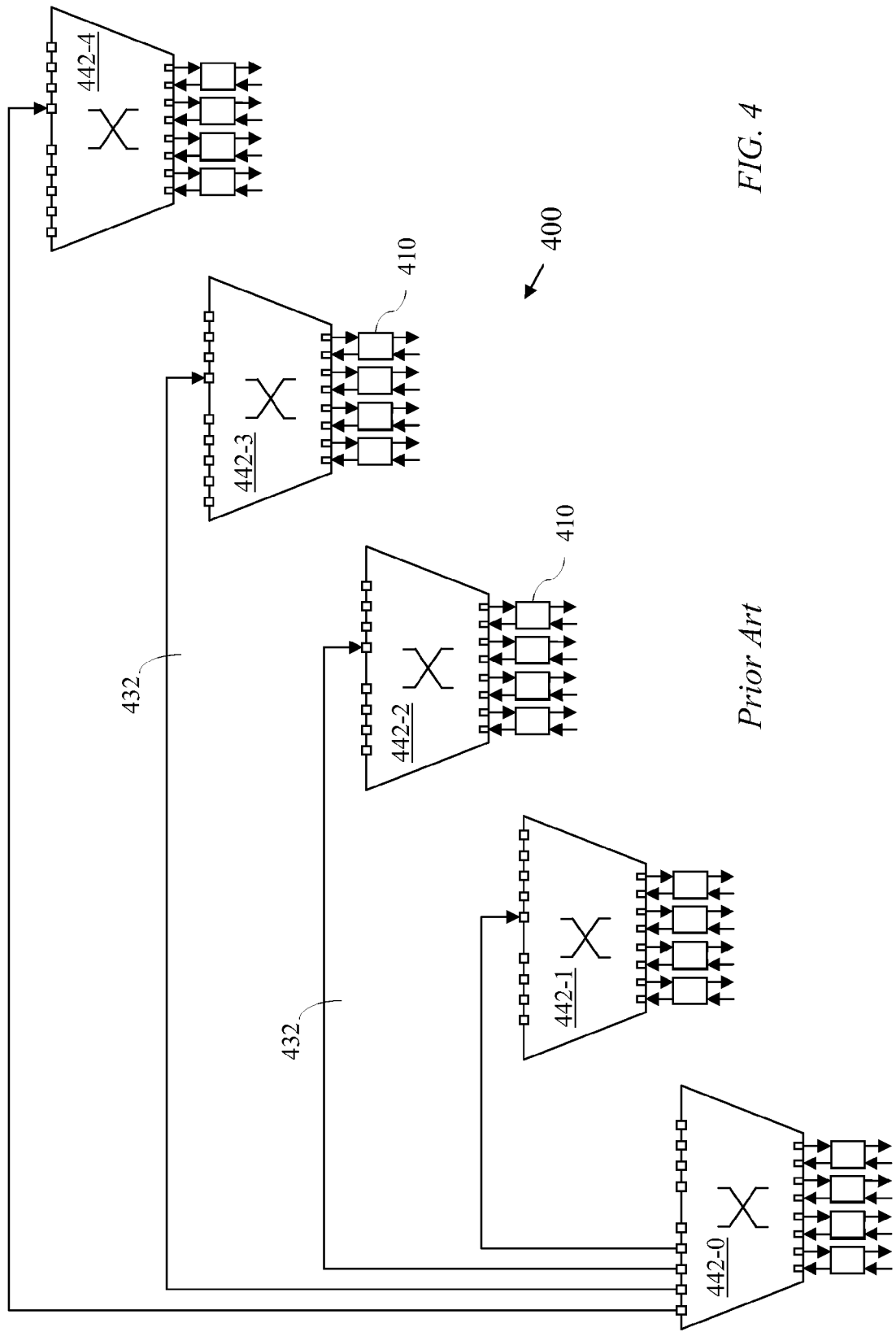
FIG. 4 illustrates a prior-art input-buffer switch using a mesh structure of switch modules.

The switch fabric 140 is preferably implemented in mesh architecture as illustrated in FIG. 4. The mesh structure 400 comprises switch modules 442 each connecting to edge nodes 410 and to other switch modules 442. The mesh architecture has several advantages including higher efficiency and reduced processing effort in comparison with the structure of FIG. 3 as described in the aforementioned patent application Ser. No. 10/223,222.

Hereinafter, the term edge node will be used to refer to an integrated source node and sink node in either a centralized switch, where input buffers are collocated with the bufferless core switch, or a distributed switch, where input buffers are separated by a significant distance from the bufferless core switch. A distributed switch requires time-coordination of the input buffers and the bufferless core switch. One form of time coordination is a time-locking process as defined above. The edge nodes may be divided into edge groups each subtending to one of the switch modules in the arrangements of FIGS. 3 to 4. An edge group includes a source group of several source nodes and a sink group of several sink nodes.

Figure 5:
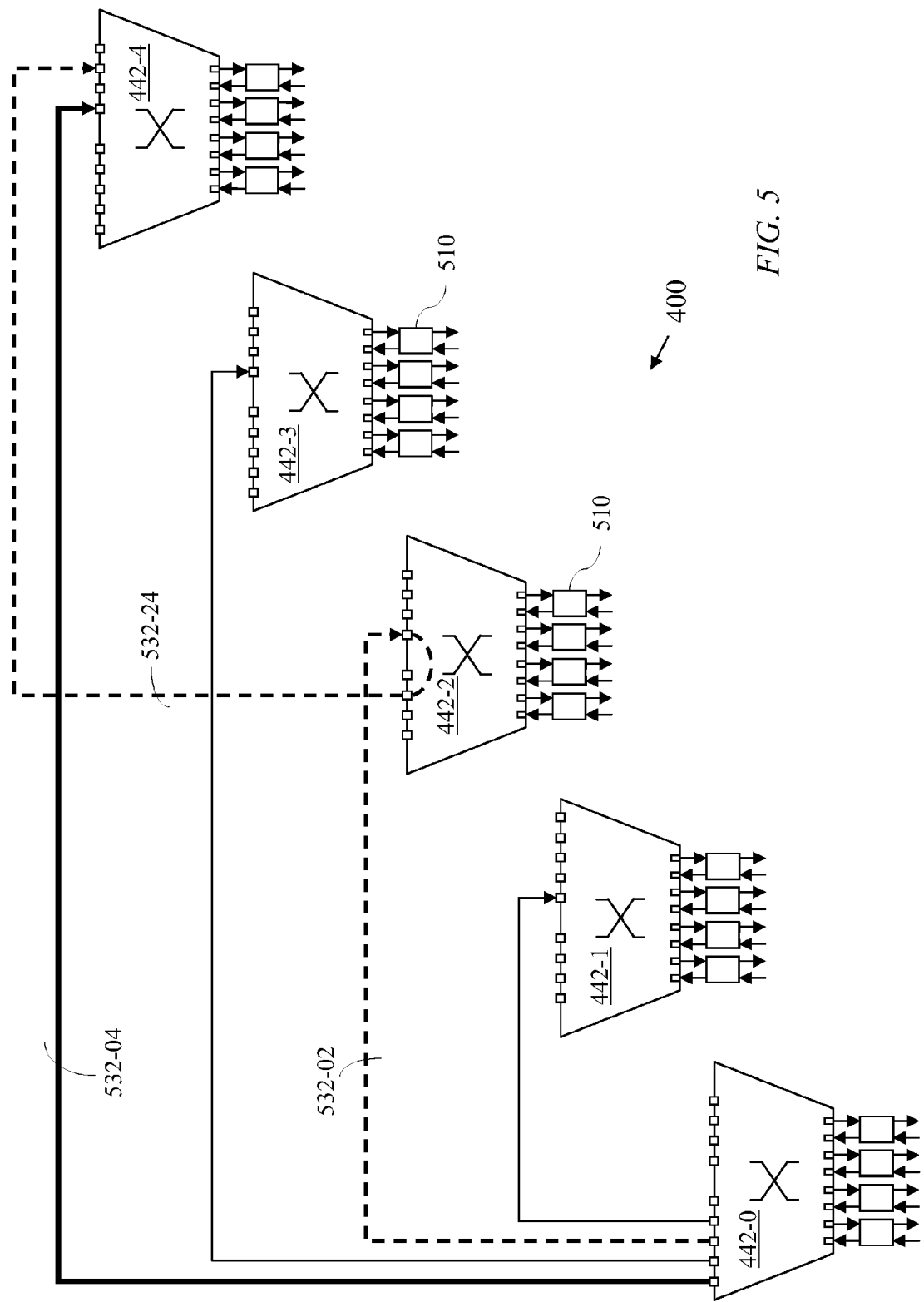
FIG. 5 illustrates paths in the mesh structure of FIG. 4.

FIG. 5 illustrates paths within the mesh structure of FIG. 4. A connection from switch module 442-0 to switch module 442-4 may be established over a direct channel 532-04 or through two cascaded channels 532-02 and 532-24. With the absence of buffers, the use of two cascaded channels requires a third-order temporal matching process. The use of a balanced connector as illustrated in FIGS. 1 and 2 significantly reduces the need for indirect connections.

Figure 6:
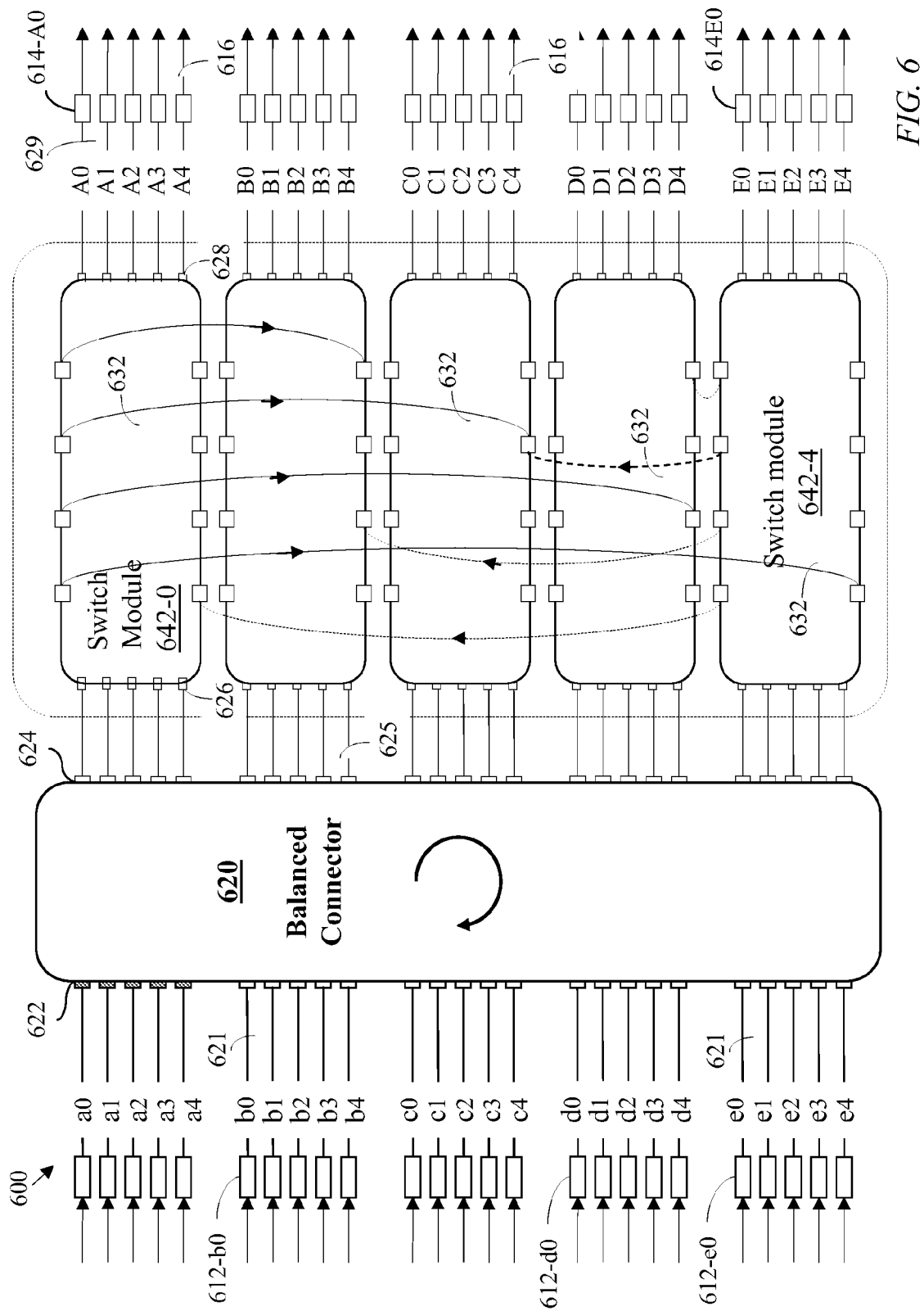
FIG. 6 illustrates an implementation of the switch of FIG. 1 where the switch fabric is a meshed interconnection of switch modules, in accordance with an embodiment of the present invention.

To equalize the load on inner channels 432 interconnecting switch modules 442 (FIG. 4), in accordance with the present invention, the traffic generated by each source node may be offered equitably to the switch modules 442 as illustrated in the switching system 600 of FIG. 6. The switch fabric illustrated in FIG. 6 comprises five switch modules 642. A temporal cyclic balanced connector 620 interposed between the source nodes 612 and switch modules 642 can perform the traffic distribution function. The balanced connector 620 may access some or all of the switch modules of a modular switch fabric. The switch modules accessed by a balanced connector are hereinafter referenced as "accessible switch modules". In the examples illustrated in this disclosure, the balanced connector 620 is connected to all switch modules 642. (It is noted that if balanced connector 620 is to precede the cascaded three-stage switch of FIG. 3, the accessible switch modules would be switch modules 341 constituting the first stage.) An edge node 610 comprises a source node 612 component and a sink node 614 component and where distinction is not required, the edge node and each of its two components are likewise referenced. Balanced connector 620 (corresponding to balanced connector 120 of FIG. 1) connects input ports 622 to output ports 624 of the balanced connector according to a fixed predefined cyclic connectivity pattern. Outbound channels 621 from source nodes 612 carry traffic to the balanced connector 620 and switch modules 642 sends traffic destined to sink nodes 614 through channels 629 (which are the inbound channels of the sink nodes). The source nodes 612 are arranged in source groups {612-*a*0, 612-*a*1, 612-*a*2, 612-*a*3, 612-*a*4}, {612-*b*0, 612-*b*1, 612-*b*2, 612-*b*3, 612-*b*4}, etc. and the sink nodes 614 are likewise arranged in sink groups {614-A0, 614-A1, 614-A2, 614-A3, 614-A4}, {614-B0, 614-B1, 614-B2, 614-B3, 614-B4}, etc. For clarity of FIG. 5, and relevant succeeding figures, the source nodes are identified by the indices {a0, a1, a2, a3, a4}, {b0, b1, b2, b3, b4}, etc. and the sink nodes are identified by the indices {A0, A1, A2, A3, A4}, {B0, B1, B2, B3, B4}, etc. A source-sink node pair, such as {a0, A0}, {a1, A1}, etc., may form an edge node. Each source group paired with a sink group forms an edge-node group.

Balanced Connector

A rotation cycle includes a predetermined number of time-intervals. A time frame, corresponding to a complete rotation cycle, is defined by a predetermined number of rotation time intervals. Each rotation time interval may be divided into a number $v \geq 1$ of time slots to realize fine switching granularity. The number of time slots per time frame is therefore an integer multiple of the number of time intervals of a rotation cycle. It is noted here that the balanced connector 620 changes its connectivity pattern every time interval while a switch module 642 may change its connectivity pattern every time slot. Herein, the time frame is selected to correspond to one rotation cycle. FIG. 7A illustrates a rotator unit 760A in a balanced connector 620. The rotator unit 760A has a rotator fabric 716 and a connectivity controller 750 which controls the input-output connectivity pattern of the rotator fabric 716. The connectivity pattern indicates the output port to which each input port connects during successive time intervals in a rotation cycle. In accordance with the present invention, an input port of the balanced connector may connect to successive output ports during successive time intervals or may connect to output ports selected in any predetermined order. The successive output ports may be determined according to a rotation shift where the output ports are assigned sequential numbers, preferably starting with zero, and each input port connects to output ports selected so as to balance the loads of the switch modules 642. In general, the connectivity pattern may be programmable.

FIG. 7B illustrates an alternate rotator unit 760B of a balanced connector 620 having a rotator fabric 716, a connectivity controller 750, and a control unit 755. The connectivity controller 750 implements a static connectivity pattern of the rotator fabric 716. The control unit 755 may receive control signals from subtending source nodes 612 and communicate control signals to another controller as will be described below with reference to FIG. 24.

FIG. 7C illustrates a balanced connector connecting input ports arranged in input groups 752 to output ports arranged in output groups 754. The balanced connector comprises an array of rotator units 760 each having a plurality of input ports forming an input group 752 and each output channel 745 connects to a selected output port in an output group 754. The rotator units 760 in FIG. 7C can be either of rotator units 760A or 760B.

Figure 8:
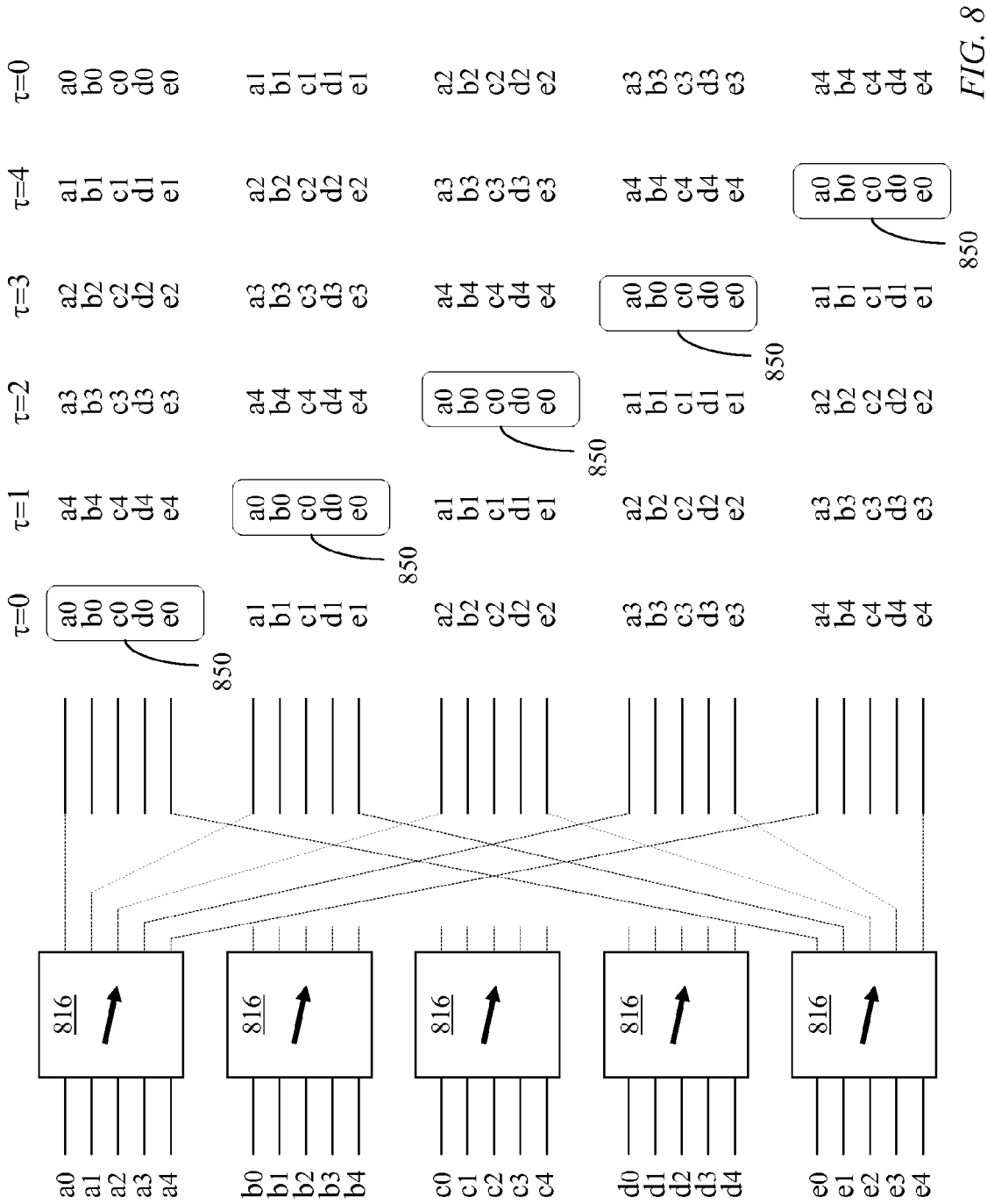
FIG. 8 illustrates the connectivity pattern of a connector comprising an array of rotator units having identical connectivity patterns.

FIG. 8 illustrates the connectivity pattern of a connector employing an array of identical cyclic rotator units 760, each having a rotation shift of unity. Although this obvious pattern would allow each source node 612 to access each switch module 642, source groups subtending to any rotator unit 760 would always access a switch module 642 together, hence always compete for the same inter-switch-module channel 632.

The overload incidence in a modular switch fabric 140, as implemented in the mesh structure of switch modules 642 of FIG. 6, can be significantly reduced by ensuring that any two source nodes 612 do not access the same switch module 642 during a large portion of a complete rotation cycle. Each input port of the balanced connector 620 receives a channel from a source node and the output ports of the balanced connector are divided into output groups connecting to switch modules 642. The balanced connector, according to the present invention, satisfies three conditions:

(1) during any two successive time intervals each input port of the balanced connector connects to output ports in different output groups 754, (2) during a time frame, each input port connects to an output port in each output group 754, and (3) during a time frame, any combination of two input ports connects only once to output ports of the same output group.

Figure 9:
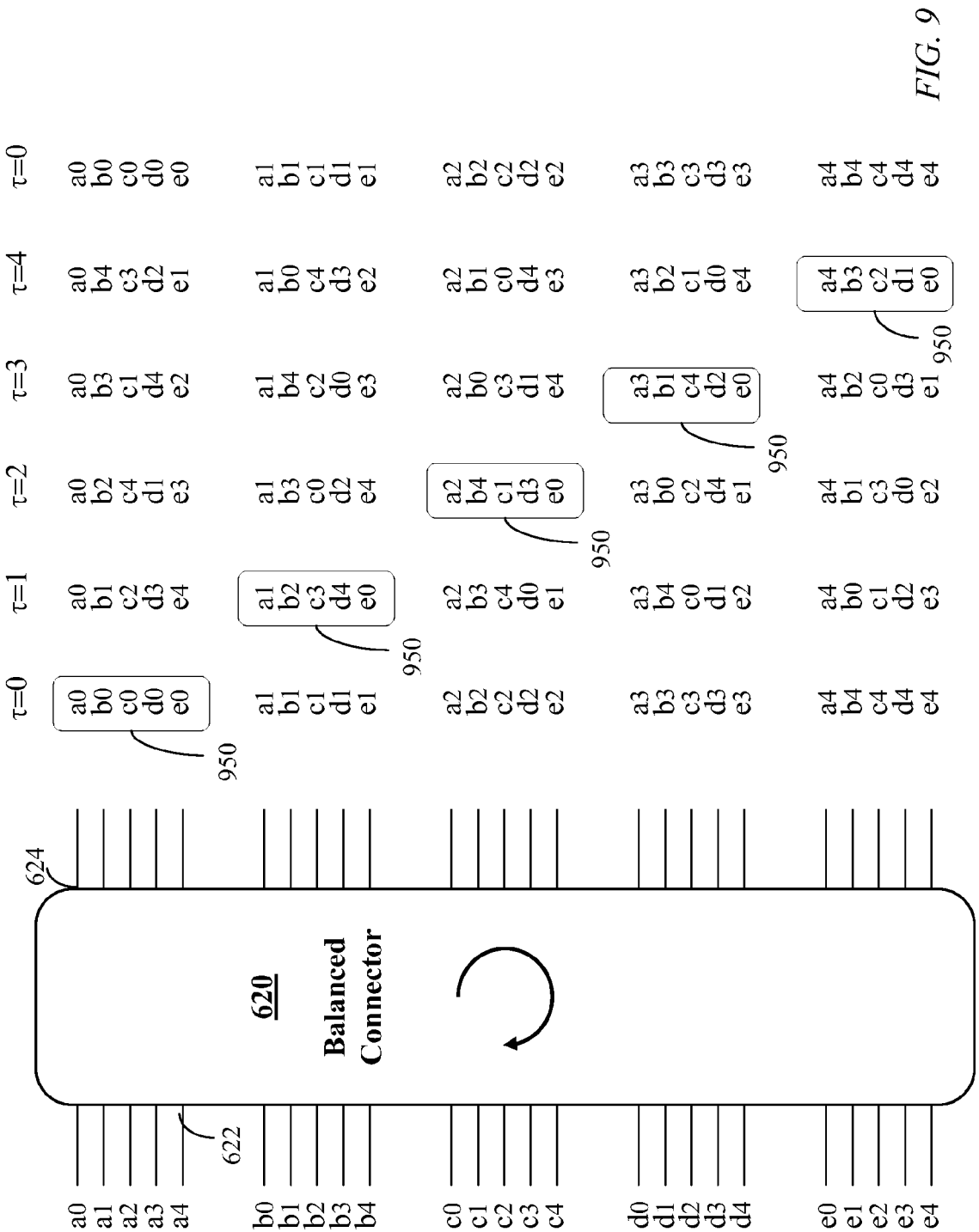
FIG. 9 illustrates a connectivity pattern of a balanced connector using a single rotator configured to provide a predefined connectivity pattern, for use with an embodiment of the present invention.

The switch thus realized has two main advantages. Firstly, it reduced the required switch-unit capacity for the same overall throughput of the entire modular switch because of a reduced requirement for internal expansion. Secondly, it reduces the processing effort by significantly reducing the need for processing-intensive third-order matching; a path through the two stages requires a second-order matching process. The rotation cycle is divided into a number of time intervals. The first time interval is denoted as $\tau=0$, the second is denoted as $\tau=1$, and so on. FIG. 9 illustrates a connectivity pattern of input ports to output ports during successive time intervals of the rotation cycle (i.e., during a time frame) a balanced connector configured to comply with the above requirement. Each output group connects to a switch module and none of the source-node groups connecting to any switch modules intersects with another source-node group connecting to any other switch module in more than one entry. For example, during the first time interval of the rotation cycle ($\tau=0$, first column in FIG. 9) source nodes {612-*a*0, 612-*a*1, 612-*a*2, 612-*a*3, 612-*a*4}, indicated in FIG. 9 as {a0, b0, c0, d0, e0}, connect to the first switch module, and during the subsequent time intervals ($\tau=1, \tau=2, \tau=3, \tau=4$) of the rotation cycle, source nodes {a0, b0, c0, d0, e0} connect to four different switch modules. This applies to all source-node groups connecting to any switch module. Thus, any pair of source nodes accesses an output group only once during each rotation cycle.

Figure 10:
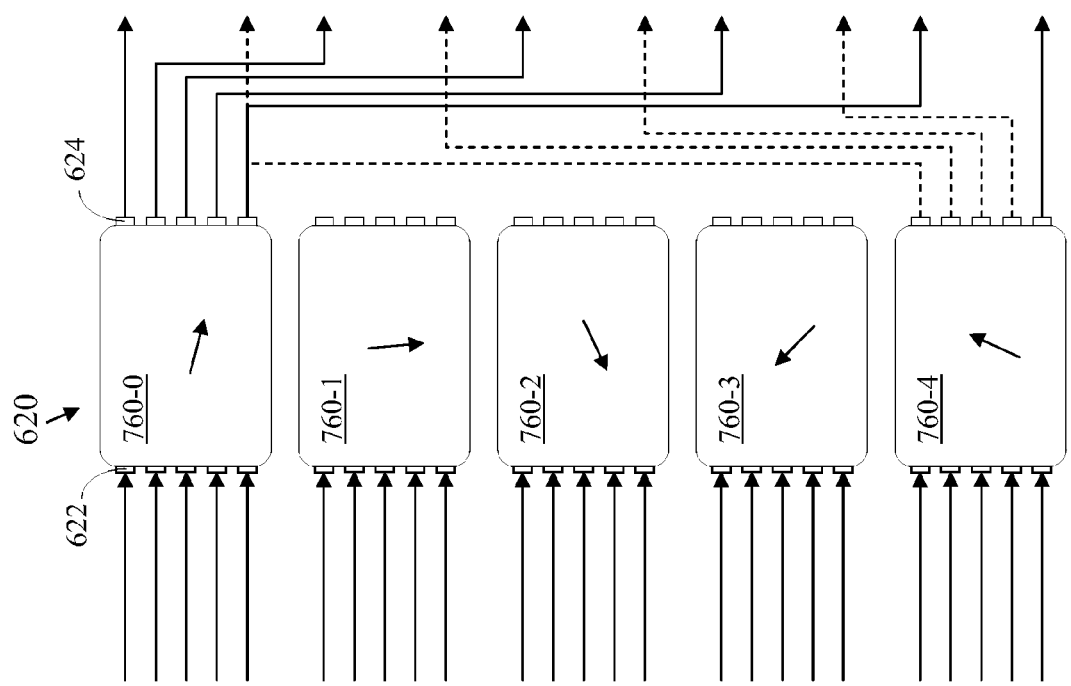
FIG. 10 illustrates a balanced connector implemented as an array of temporal cyclic rotators having different rotation shifts, in accordance with an embodiment of the present invention.

FIG. 10 illustrates an implementation of the balanced connector 620 of FIG. 6, potentially of large dimension (exceeding 1000×1000 for example), with an array of rotator units 760 of smaller dimension (each of dimension 61×61 for example), where the rotator units 760 have graduated rotation shifts. The number of rotator units 760 is preferably less than or equal to the number J of output ports per rotator unit. Indexing the rotator units 760, in any arbitrary order, as 0 to (J−1), the $j^{th}$ rotator unit (760-j) has a rotation shift of j, $0 \leq j < J$. Thus, in a rotator unit 760-j having M input ports and M output ports, an input port connects to output ports k, $(k+j)_{mod\ M}$, $(k+2j)_{mod\ M}$, etc., where k is an identifier of an output-port accessed by a given input port at a reference time interval (time-interval zero, for example) of a rotation cycle. For example, if M=7, j=4, an input port labeled 2 connects to output ports 2, $(2+4)_{mod\ 7}$, $(2+8)_{mod\ 7}$, $(2+12)_{mod\ 7}$, $(2+16)_{mod\ 7}$, $(2+20)_{mod\ 7}$, $(2+24)_{mod\ 7}$, $(2+28)_{mod\ 7}$, i.e., 2, 6, 3, 0, 4, 1, 5, 2, etc., during a time frame of seven time intervals. Thus, the input port connects to all the output ports labeled 0 to 6 during each rotation cycle.

Figure 11:
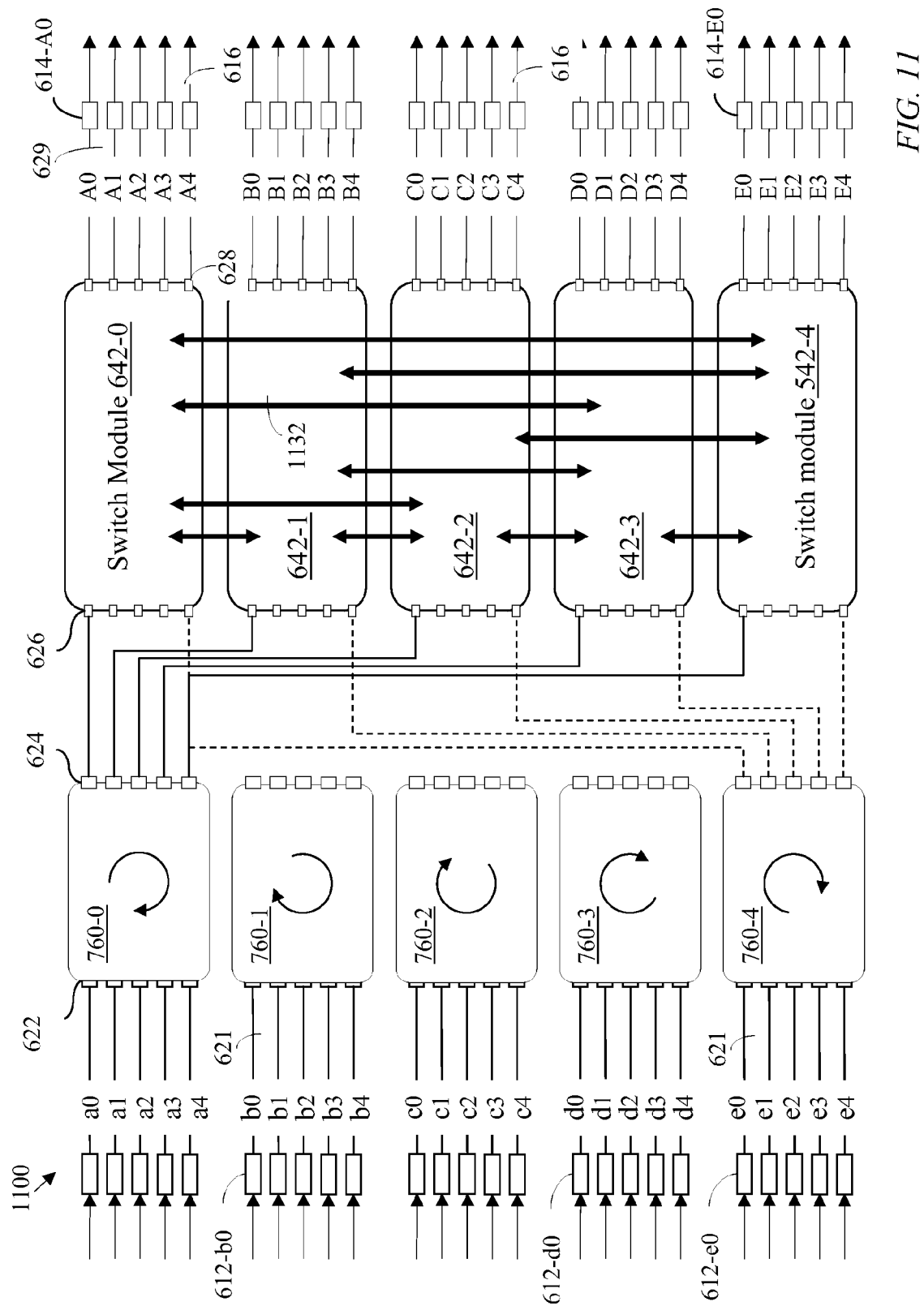
FIG. 11 illustrates the switch of FIG. 6 using the balanced connector of FIG. 10, in accordance with an embodiment of the present invention.

FIG. 11 illustrates a switching system 1100 having the configuration of switching system 600 of FIG. 6 with the balanced connector 620 implemented using an array of rotator units 760-0 to 760-4 having different rotation shifts. The rotator units 760 may be configured as rotator unit 760A or 760B (FIG. 7), depending on the control mechanism employed. The switch modules 642-0 to 642-4 are configured in a mesh structure as described with reference to FIG. 6 and the inter-switch-module channels 632 are represented in FIG. 11 by two-way channels 1132. The source nodes 612 in switching system 1100 are arranged in source groups each subtending to a rotator unit 760, and the sink nodes 614 are arranged in sink groups each connecting directly to output ports of a switch module 642.

The output ports of each rotator unit 760 in FIG. 11 connect to selected inlet ports of the switch fabric comprising switch modules 642. Thus, each input port of a rotator unit 760 cyclically connects to selected inlet ports during a rotation cycle. The selected inlet ports of the switch fabric preferably belong to different switch modules 642. The output ports of the rotator units 760 that connect to a specific switch module 642 form an output group 754 as defined with reference to FIG. 7. A rotation shift of a rotator unit 760 is then the spatial separation between output groups to which an input port of the rotator unit connects during successive time intervals.

Rotator-Connectivity Controller

The connectivity of input ports to output ports of a rotator unit 760 is controlled by a rotator-connectivity controller 750 as illustrated in FIG. 7A. The connectivity is preferably determined according to a predetermined rotation shift. An input port 622 of a rotator unit 760 may connect to different rotator output ports 624 during successive time intervals. A rotation cycle preferably has a number of rotation time intervals equal to the number of output ports of a rotator unit 760. Denoting the number of output ports of the rotator unit as J>1, the output ports of a rotator unit 760A or 760B, selected in an arbitrary order, are labeled 0 to (J−1). During a reference time interval of the rotation cycle (relative time-interval zero, for example), each input port 622 connects to a selected output port 624. During a subsequent time interval, each input port 622 connects to an output port 624 having a label shifted from its current value by a predetermined value, herein called a rotation shift σ. Thus, a given input port 622 connecting to an output port 624 labeled $y_0$ at time τ=0 of a rotation cycle is subsequently connected to output port $[y_0+σ]$ (modulo J) at time interval τ=1. FIG. 12 illustrates a rotation-shift of two (σ=2) in a rotator unit having five output ports 624 (J=5). The number of input ports 622 is also equal to five in this example. Input port 622-2, for example, cyclically connects to output ports 624-2, 624-4, 624-1, 624-3, and 624-0 during a rotation cycle of five time intervals. FIG. 12 illustrated the connectivity pattern of a rotator units having J=5 with a rotation shift of three (σ=3). With σ=3, input port 622-2 cyclically connects to output ports 624-2, 624-0, 624-3, 624-1, and 624-4.

Thus, the sequence of output ports 624 to which an input port 622 connects during successive time intervals of a time frame is determined as $[y_0+σ×τ]$ modulo J, where $y_0$ is some initial value and τ is an index of cyclic time interval so that $0 \leq τ < Γ$, Γ being the number of time intervals per time frame (i.e., per rotation cycle). Selecting the number of time intervals Γ, to equal the number J of output ports of a rotator unit, and with the output ports given sequential numbers preferably starting with zero, then the sequence of output ports to which an input port connects is determined as: $y_τ = [y_0+σ×τ]$ modulo J, with $0 \leq τ < J$. The output-port sequence $y_τ$, $0 \leq τ < J$, includes each output port if J is a prime number.

Figure 14A:
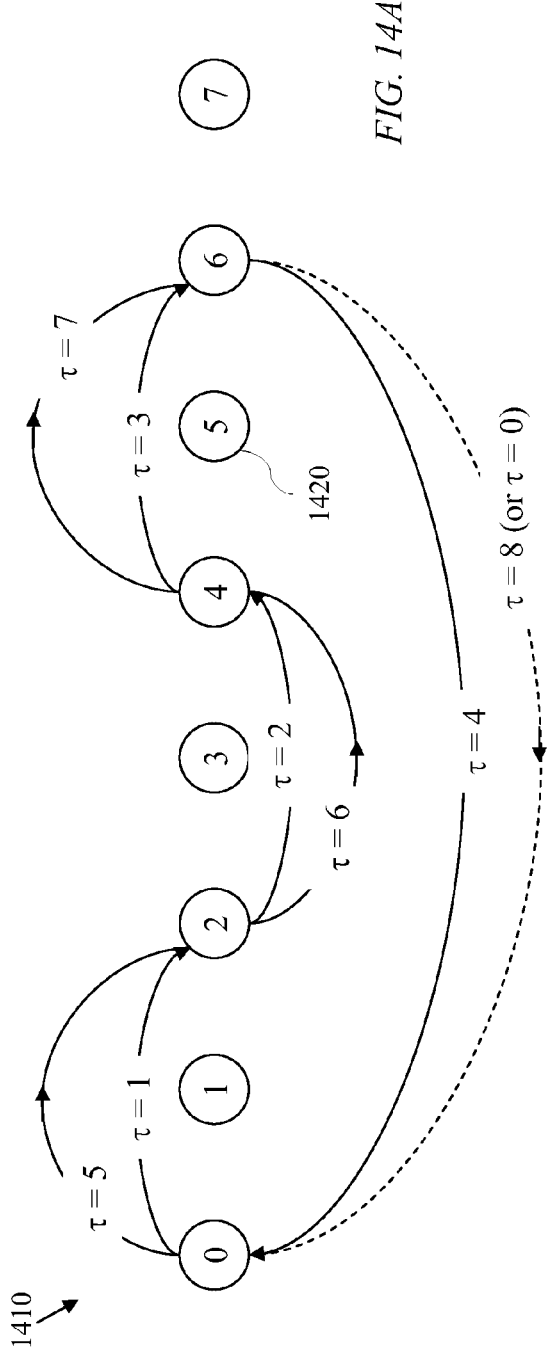
FIG. 14A illustrates a complete rotation cycle of a rotator unit having eight output ports with a rotation shift of two.
Figure 14B:
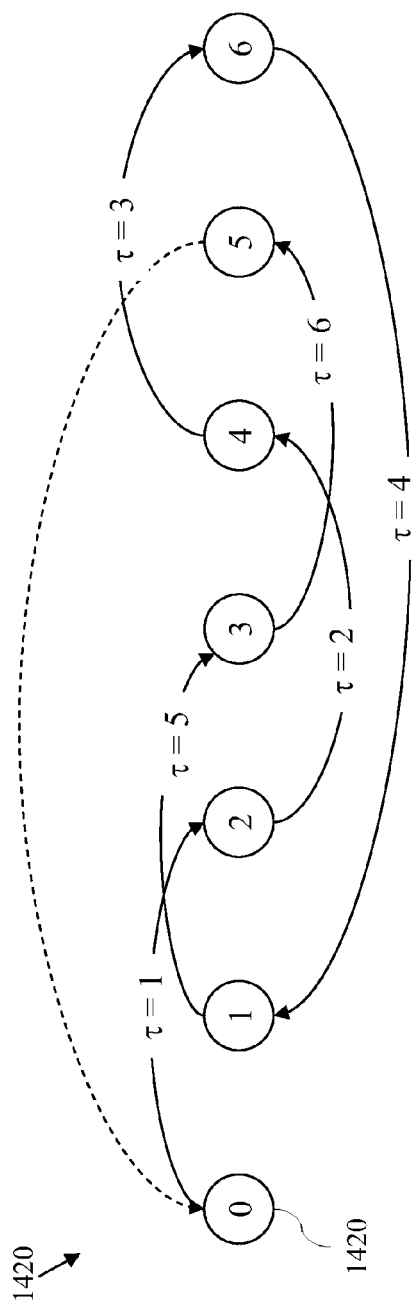
FIG. 14B illustrates a complete rotation cycle of a rotator unit having a prime number, seven, of output ports with a rotation shift of two, for use with an embodiment of the present invention.

FIG. 14A and FIG. 14B illustrate the sequence $y_τ$ with σ=2 over a time frame of eight time intervals (Γ=8) and a time frame of seven time intervals (Γ=7), respectively. Each circle, 1420, represents a dual port (an input port 622 and an output port 624) of the rotator unit 760 with an arrow emanating from the input side of a dual port and an arrow directed to the output side of the dual port. For brevity, the dual ports are labeled 0 to 7. A connection from an input port 622 to an output port 624 is associated with a rotation time-interval index τ. At time interval 0 of the rotation cycle, input port 0 connects to output port 0 (an arbitrary selection). With a rotation shift of 2 (σ=2) input port 0 (i.e., 622-0) connects to output port 624-2 at time interval 1 of the rotation cycle, then to output port 4 during the subsequent interval (τ=2), and so on. At time interval τ=4, input port 0 connects again to output port 0 before the rotation cycle is completed. Thus, in the case of Γ=8, each of output ports (0, 2, 4, and 6) is accessed twice during the time frame (rotation cycle) while none of output ports (1, 3, 5, and 7) is accessed. With Γ=J=7 (a prime number), each output port is accessed by the respective input port as illustrated in FIG. 14B. With a rotation shift of 2 (σ=2) input port 0 (i.e., 622-0) connects to output port 624-2 at time interval 1 of the rotation cycle, then to output ports 4, 6, 1, 3, 5, 0, during the subsequent intervals τ=2, 3, 4, 5, 6, and 7. At time interval τ=7, input port 0 connects again to output port 0 and the rotation cycle is completed with each output port 624 accessed.

Figure 15A:
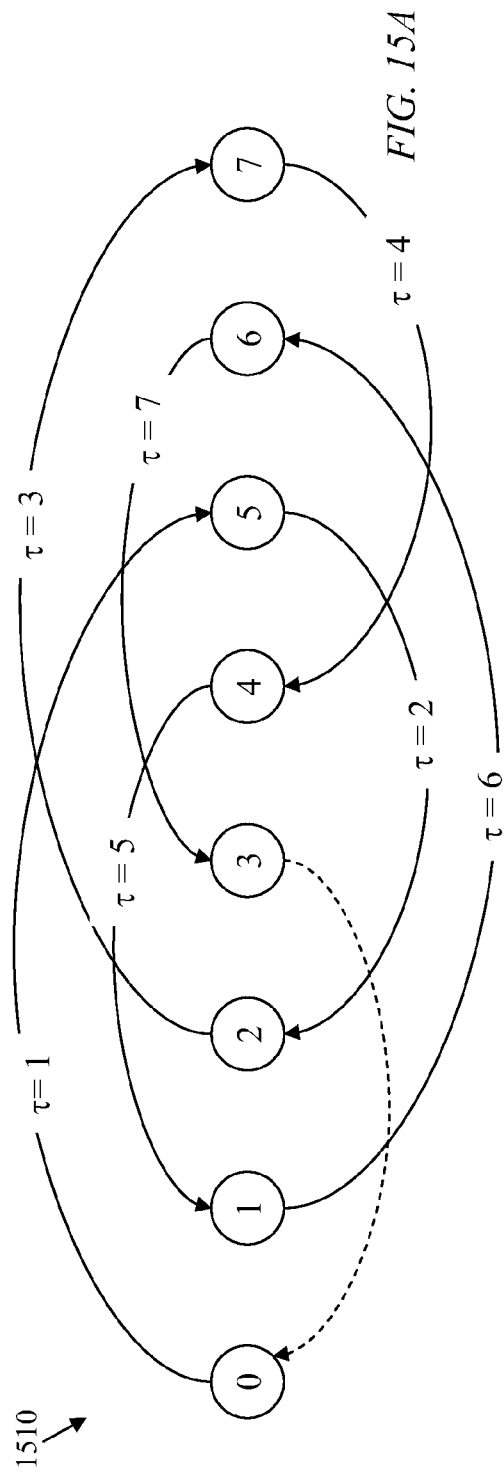
FIG. 15A illustrates a complete rotation cycle of a rotator unit having eight output ports with a rotation shift of five.
Figure 15B:
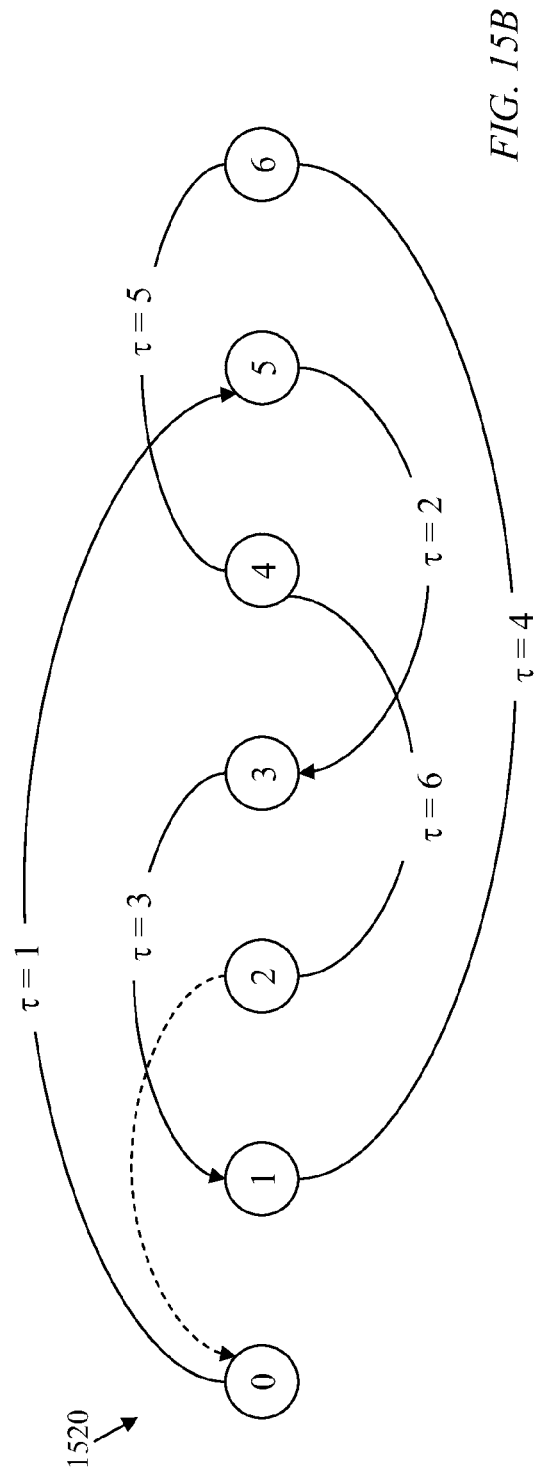
FIG. 15B illustrates a complete rotation cycle of a rotator unit having a prime number, seven, of output ports with a rotation shift of five, for use with an embodiment of the present invention.

FIG. 15A and FIG. 15B illustrate another case with σ=5 and J=8 and 7. In both cases the sequence $y_τ$ of output ports of a rotator unit 760 included each output port. An input port can connect to an output port more than once during a rotation cycle if the value σ×τ becomes a non-zero integer multiple of J. With σ=5, and J=8, the values of σ×τ for τ=0, 1, . . . , 7 are 0, 5, 10, . . . , and 35, none of which is a positive integer multiple of 8, and each output port of a rotator unit 760 is therefore accessed. This is, however, specific to the value of σ=5. With σ=4, for example, the values of σ×τ for τ=0, 1, . . . , 7 are 0, 4, 8, 12, 16, 20, 24, and 28, respectively. These correspond to output ports $(y_0+0)$, $(y_0+4)$, $(y_0+0)$, $(y_0+4)$, $(y_0+0)$, $(y_0+4)$, $(y_0+0)$, and $(y_0+4)$. It is noted that output ports 8, 16, 24, etc. correspond to reference output port 0. Thus, only output ports $(y_0+0)$ and $(y_0+4)$ are accessed during the time frame and the remaining six output ports are not accessed. When J is a prime number J, the value σ×τ can not be a non-zero integer multiple of J except when τ is an integer multiple of J. The rotation time-interval index τ is relative to a time frame and takes values of 0 to (J−1). In the above example of σ=4 and J=7. The values of σ×τ for τ=0, 1, . . . , 6 are 0, 4, 8, 12, 16, 20, and 24, respectively, none of which being a non-zero integer multiple of 7. These correspond to output ports 0, 4, 1, 5, 2, 6, and 3 respectively, i.e., each output port of the rotator unit is accessed.

In summary, in order to ensure that, during a time frame, each input port connects to an output port in each output group, the number J of output ports per rotator unit is preferably selected to be a prime number. The number of time intervals per time frame is selected to equal the number J and each time interval may contain several time slots where each time slot may correspond to a connection. It is noted that the configuration of each rotator unit 760 changes in successive time intervals while the configuration of any switch module may change in successive time slots; a time interval comprising an integer number of time slots. The number of time slots per time intervals is arbitrary. However, this number is preferably larger than the number J of output ports per rotator unit in order to provide fine granularity and to reduce the control overhead if control signals are switched to a controller through the switch modules.

Scatter Coefficient

As illustrated in FIG. 9, each input port of an input group of a balanced connector 620 connects to an output port of the same output group during the first time interval (τ=0). The connectivity of FIG. 9 corresponds to a case where the number of output groups J is five and the number of time intervals per rotation cycle Γ is also five. During the subsequent time intervals (τ=1, to τ=4), the input ports 622 of each input-port group connect to output ports 624 in different output-port groups. Thus during the rotation cycle, the number of output groups accessed by input ports 622 are 1, 5, 5, 5, and 5. The total number of output groups accessed by a given subset of input ports 622 divided by the product J×Γ is herein called a scatter coefficient of the subset of input ports. In the example of FIG. 9, the total number of output groups accessed by any input port 622 is 21 and with J=Γ=5, the scatter coefficient of each input group is 0.84 (21/25).

FIG. 17 illustrates a connectivity pattern 1702 of a subset of input ports 622 including input ports 622c1, 622d1, 622e1, 622d2, and 622 e2 which yields a scatter coefficient of 0.76 (19/25). Connectivity pattern 1704 of input ports 622a1, 622b0, 622c4, 622d3, and 622 e2 (derived from the connectivity pattern of FIG. 16) yields a scatter coefficient of 0.84 as expected.

A connection from an inlet port 626A of a switch module 642A to an outlet port 828B of another switch module 642B may be established over a direct channel 632 between switch modules 642A and 642B. However, if the direct channel does not have a sufficient vacancy to accommodate the connection, the connection may be routed through any of the switch modules 642, other than 642A and 642B, thus requiring a third-order time-slot matching process. When the scatter coefficient is high (close to 1.0), a large proportion of the traffic load from the source nodes 610 may be established through direct links, thus avoiding a computationally intensive third-order matching process. However, if none of the direct paths to switch module 642B from all other switch modules 642, has a sufficient vacancy, an indirect path may be sought. The use of the balanced connector reduces the proportion of indirect links to an insignificant level.

Meshed Switch Modules

In the mesh structure of FIG. 4, a path from a first switch module 442 to a second switch module 1842 may be a direct path or a two-link path traversing a switch module other than the first and second switch modules as described with reference to FIG. 5. Indirect paths are essential, even in a full mesh structure where each switch module is connected to each other switch module, to accommodate traffic of unbalanced spatial distribution where the traffic from any switch module is not evenly directed to all switch modules.

Figure 18:
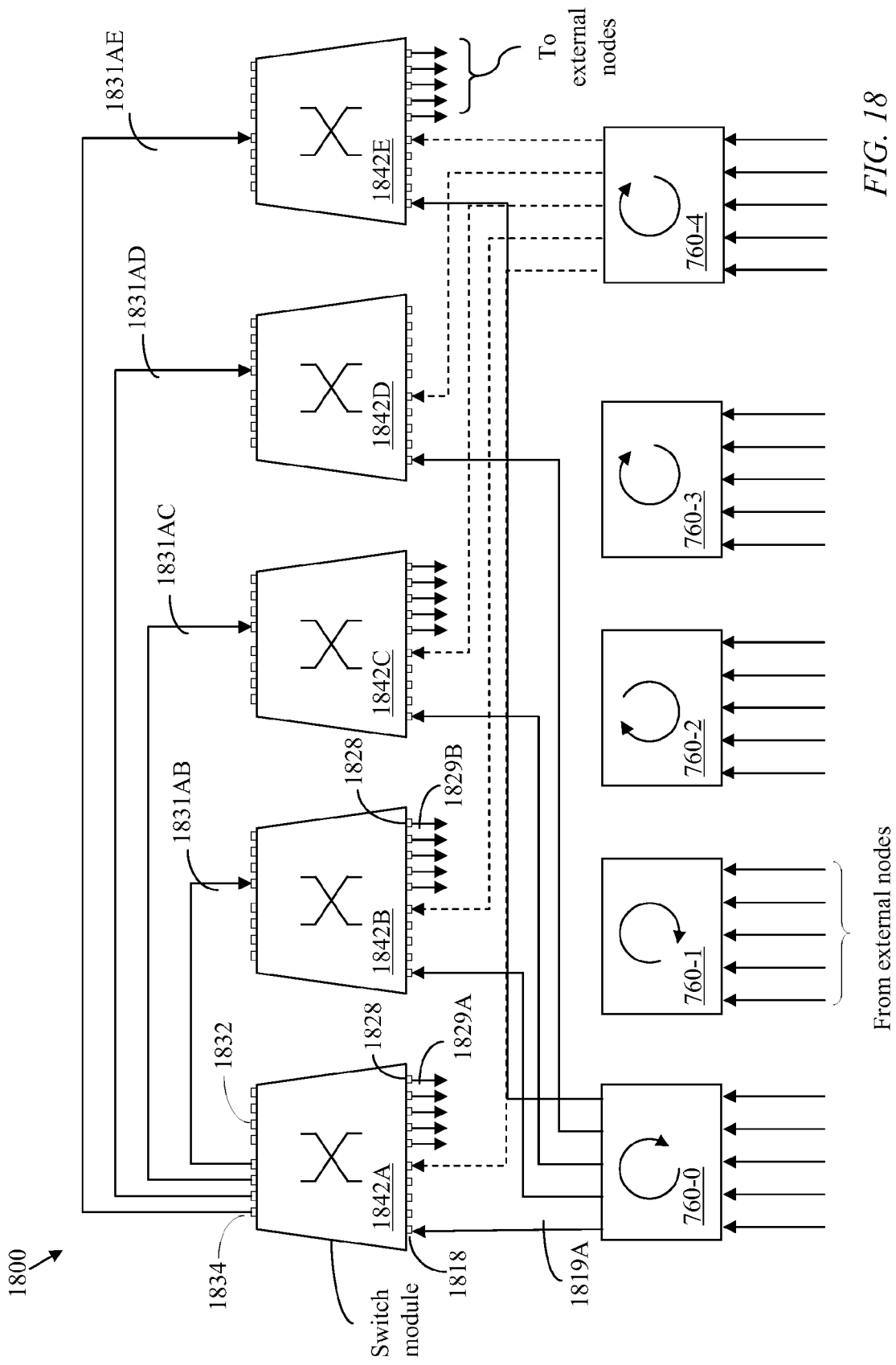
FIG. 18 illustrates an interconnection configuration of switch modules of the switch fabric of FIG. 11 having a single array of switch modules arranged in a mesh structure, in accordance with an embodiment of the present invention.

FIG. 18 illustrates a balanced bufferless switch 1800 comprising switch modules 1842 interconnected in a mesh structure and preceded by a balanced connector implemented as an array of rotator units 760 having graduated rotation shifts. The input ports of the switch module 1842 are functionally divided into inlet ports 1818 receiving signals through channels 1819 from rotator units 760 and inward ports 1832 receiving signals from other switch modules 1842 through channels 1831. The output ports of the switch module 1842 are functionally divided into outlet ports 1828 transmitting signals to sink nodes through channels 1829 and outward ports 1834 transmitting signals to inward ports 1832 of other switch modules 1842 through channels 1831. A mesh structure has the advantage of enabling internal connections within each switch module 1842 as well as direct connections between switch modules 1842, thus helping to reduce the traffic load offered to the inner links between switch modules. In a full mesh structure 1800, a path from an inlet port of a first switch module 1842 to an outlet port of the same switch module 1842 may be established within the first switch module and a path to an outlet port of a second switch module may traverse a direct channel 1831 connecting the first switch module 1842 to the second switch module 1842 or may be an indirect path through any switch module 1842 other than the first and second switch modules.

Internal Expansion

An internal expansion, where the inner capacity of a switch module exceeds its outer capacity, is required in a mesh structure for two main reasons. The first is to compensate for the capacity consumption of paths traversing more than one inner link. The second is to offset the effect of internal blocking caused by misalignment of vacant time slots. Preferably, in the mesh structure of FIG. 18, only intra-switch-unit paths and direct inter-switch-unit paths may be used. The need for indirect paths is significantly reduced by using the balanced connector described above with reference to FIGS. 1, 6, 11, and 18. A path traversing three switch modules, i.e., a path from a switch module to another switch module through an intermediate switch module, requires a processing-intensive third-order time-slot matching process. A direct path from one switch module 1842 to another requires a second-order time-slot matching process and a relatively small internal expansion may be required to offset the effect of time-slot misalignment. A significantly larger internal expansion would be needed if paths requiring intermediate switching are used for a large proportion of traffic. The need for larger internal expansion results from the use of more resources per connection and the consequential increase in mismatch probability.

Switch Controller

Figure 19:
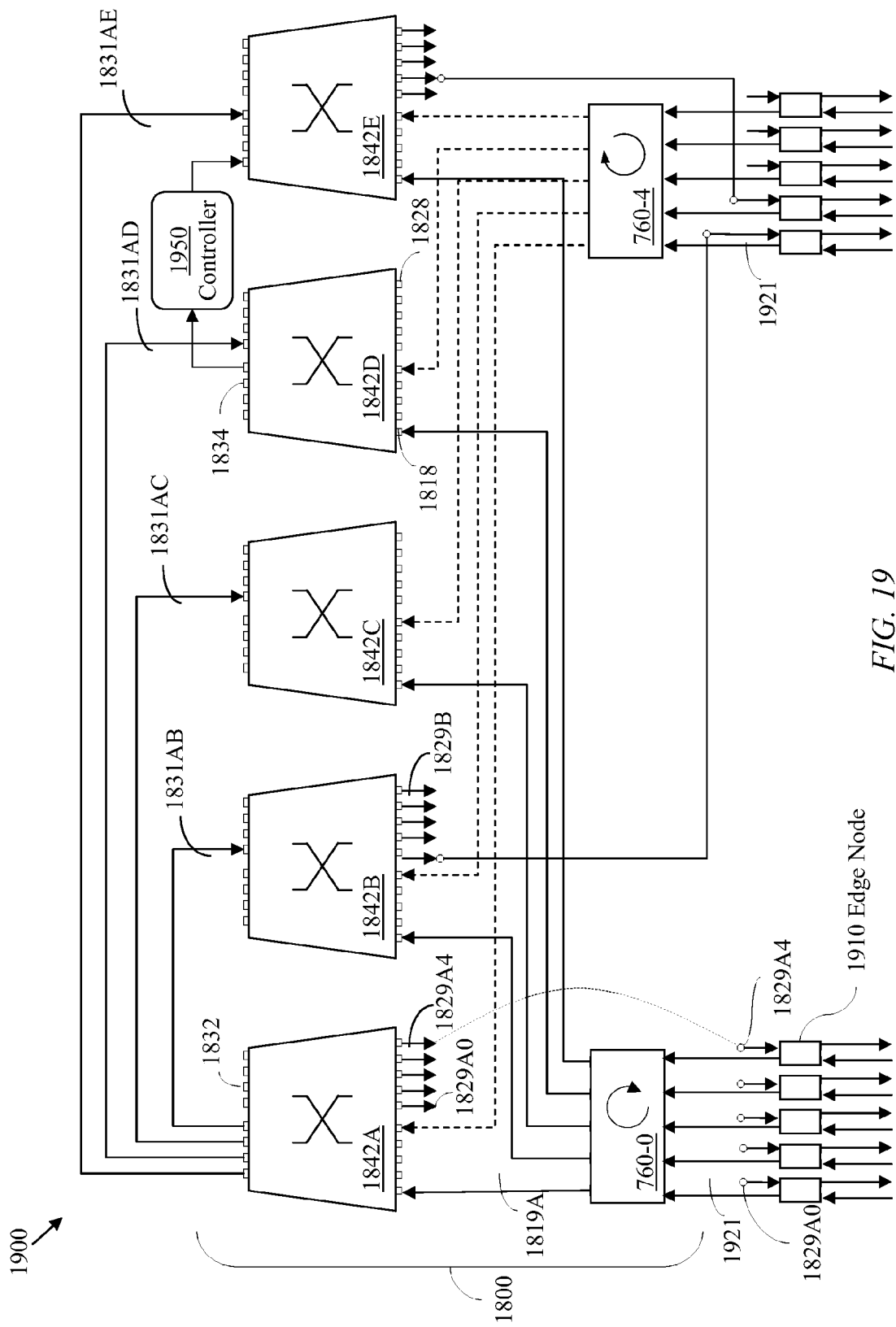
FIG. 19 illustrates the switch of FIG. 18 including a core controller, in accordance with an embodiment of the present invention.
Figure 20:
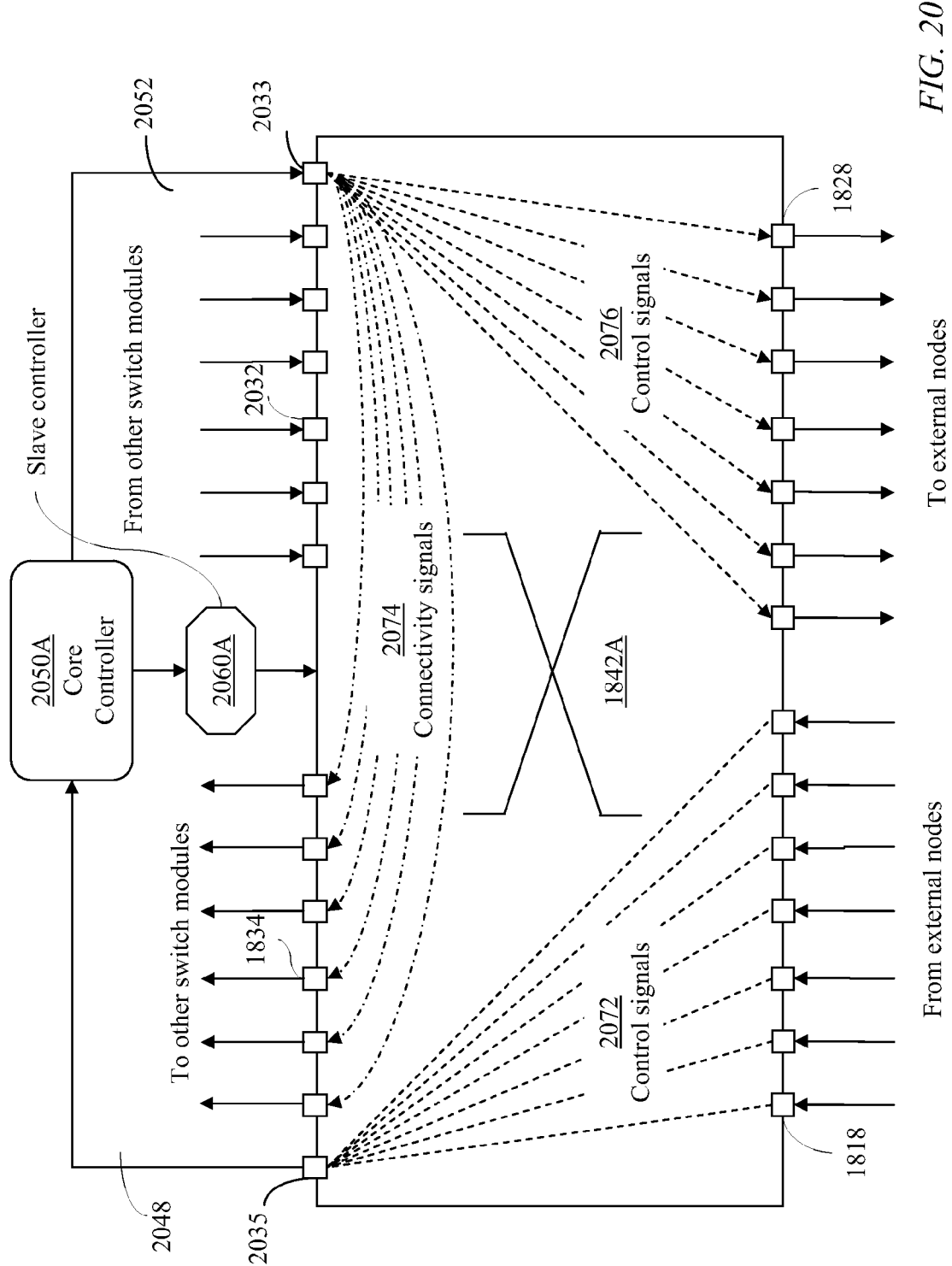
FIG. 20 illustrates a switch module, in accordance with an embodiment of the present invention, selected to host a core controller of the switch of FIG. 19 where the controller exchanges control signals with all the switch modules and with external nodes, such as edge nodes; the control signals are received from all external nodes at only the selected switch module which switches the control signals to all other switch modules.

FIG. 19 illustrates a switching system 1900 comprising a balanced bufferless switch 1800 and edge nodes 1910 arranged in groups each group connecting to a rotator unit 760 in the upstream direction and to a switch module 1842 in the downstream direction. A switch controller 1950 is connected between an outward port 1834 of a switch module 1842D and an inward port 1832 of another switch module 1842E. As described earlier, a switch module 1842 connects to external nodes through inlet ports 1818 and outlet ports 1828 and connects to other switch modules 1842 through outward ports 1834 and inward ports 1832. The controller may be connected between an outward port of a switch module and an inward port of the same switch module, as illustrated in FIG. 20. Controller 1950 receives control signals from edge nodes during staggered time intervals and communicates control signals to the edge nodes during staggered time intervals. Control signals are switched in the switch modules 1842D and 1842E to and from the controller 1950. Edge nodes 1910 have asymmetrical connections to switch 1800. Each edge node 1910 has a source node similar to source node 612 and a sink node similar to sink node 614 of FIG. 6. The source nodes and sink nodes are not illustrated separately in FIG. 19. The source node of each edge node 1910 has an outbound channel 1921 to an input port of a rotator unit 760 and the sink node of each edge node 1910 has an inbound channel 1829 from an outlet port 1828 of a switch module 1842. Thus, a source node of an edge node 1910 may transmit to all switch modules 1842 while a sink node of an edge node 1910 may receive only from one switch module 1842.

FIG. 20 illustrates a switch module 1842A supporting a core controller 2050A in the mesh structure of FIG. 19 to enable the exchange of control signals between the core controller 2050A and all edge nodes. Because each edge node 1910 accesses each switch module 1842 during each time frame, a controller residing at the inner side of a switch module can be accessed by each edge node. The volume of control signals is typically much smaller than that of payload signals and access to the controller 2050A is facilitated by dividing each time interval into a number of time slots exceeding the number of inlet ports 1818 or outlet ports 1828 so that each inlet port 1818 can communicate with the controller 2050A during each rotation cycle and, likewise, the controller 2050A can communicate with each outlet port 1828 during a rotation cycle. Recall that during a rotation cycle, each source node may connect to a switch module 1842 only once during a rotation cycle. As defined earlier, the inner side includes outward ports 1834 and inward ports 1832. Switched control paths 2072 carry control signals received at inlet ports 1818 of switch module 1842A to the core controller 2050A through a designated outward port 2035 and a communications channel 2048. Switched control paths 2076 carry control signals from the core controller 2050A to outlet ports 1828 of the switch module 1842A through a communications channel 2052 and a designated inward port 2033. Switched control paths 2074 carry control signals to all other switch modules 1842 through the switch fabric and the outward ports 1834 of the switch module 1842A hosting the core controller 2050. The control signals conveyed through paths 2074 are primarily switch-fabric control signals, herein called connectivity signals, directed to slave controllers 2060 of other switch modules 1842. Slave controller (connectivity controller) 2060A of switch module 1842A is connected directly to core controller 2050A. As stated earlier, each switch module 1842, including the particular switch module 1842A hosting the core controller 2050A, is accessed during each rotation cycle by each edge node in a distributed switch where the edge nodes are not necessarily collocated with the space switch. Each edge node can, therefore, exchange control signals with the core controller 2050A through its host switch module 1842A. Alternative arrangements can be devised to deliver control signals to, and receive control signals from, the core controller 2050A. Furthermore, a second switch module 1842 may host a second core controller (not illustrated) for reliability and, possibly, for load sharing.

Figure 21:
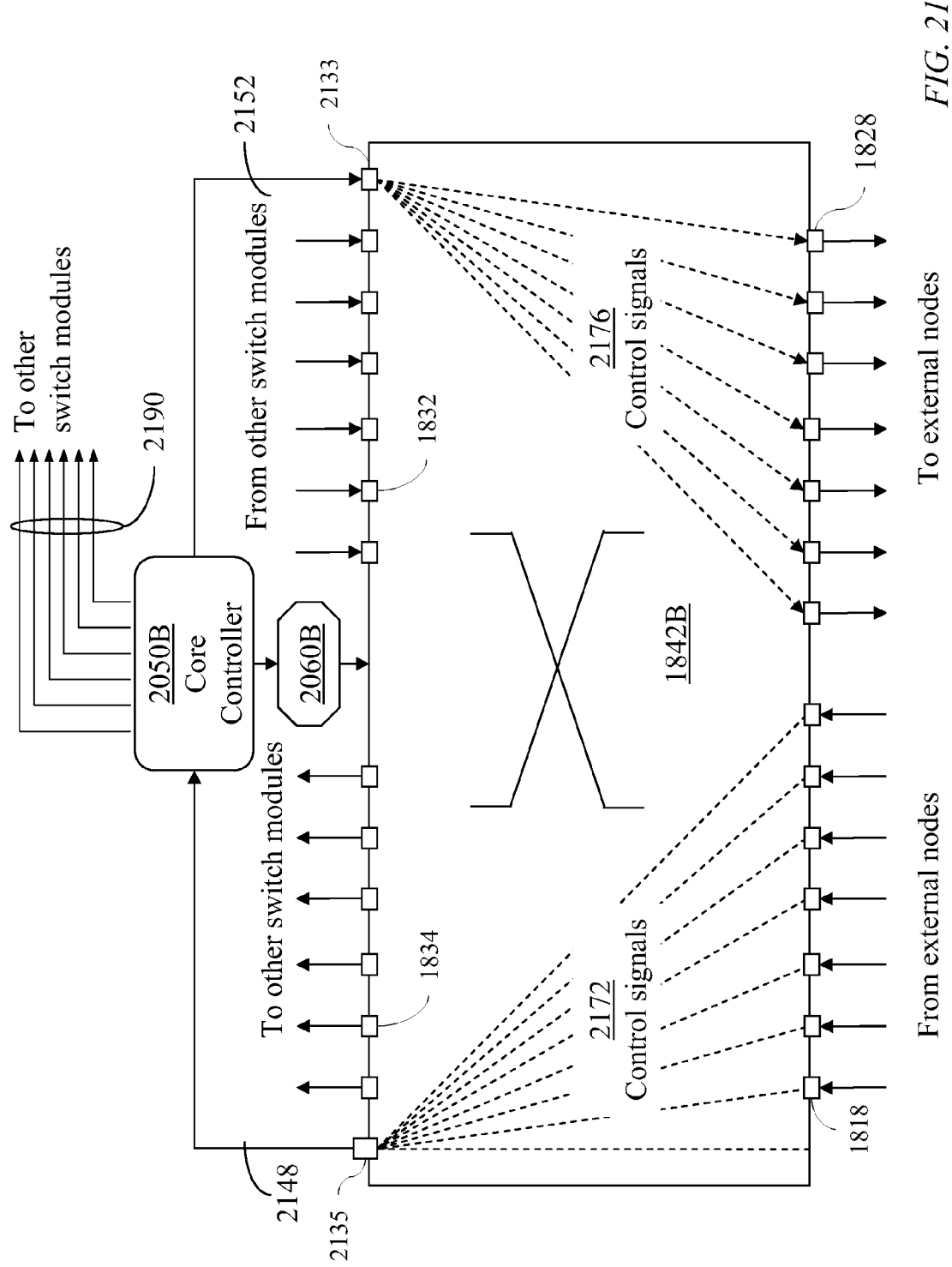
FIG. 21 illustrates a switch module selected to accommodate a core controller of the switch of FIG. 19 where the controller communicates directly with each other switch module, in accordance with an embodiment of the present invention.

Instead of using the switched control paths 2074 of FIG. 20, alternate control paths 2190, as illustrated in FIG. 21, from a core controller 2050B to all switch modules 1842, other than the host switch module 1842B, may be used. The control paths 2190 are direct paths to slave controllers 2060 of the switch modules 1842. A slave controller 2060B of switch module 1842B receives connectivity decisions from a core controller 2050B for each time slot of the time frame and controls the connectivity of the switch fabric of the switch module accordingly. Recall that a time frame has a number of time intervals preferably equal to the number J of output ports per rotator unit 760 and that each time interval may contain several time slots. The time slots of any time interval may be switched to different destinations through the switch fabric. Control signals 2172 and 2176 have the same functions of control signals 2072 and 2076 of FIG. 20. Thus, switched control paths 2172 carry control signals received at inlet ports 1818 of switch module 1842B to the core controller 2050B through a designated outward port 2135 and a communications channel 2148. Switched control paths 2176 carry control signals from the core controller 2050B to outlet ports 1828 of the switch module 1842B through a communications channel 2152 and a designated inward port 2133.

Figure 22:
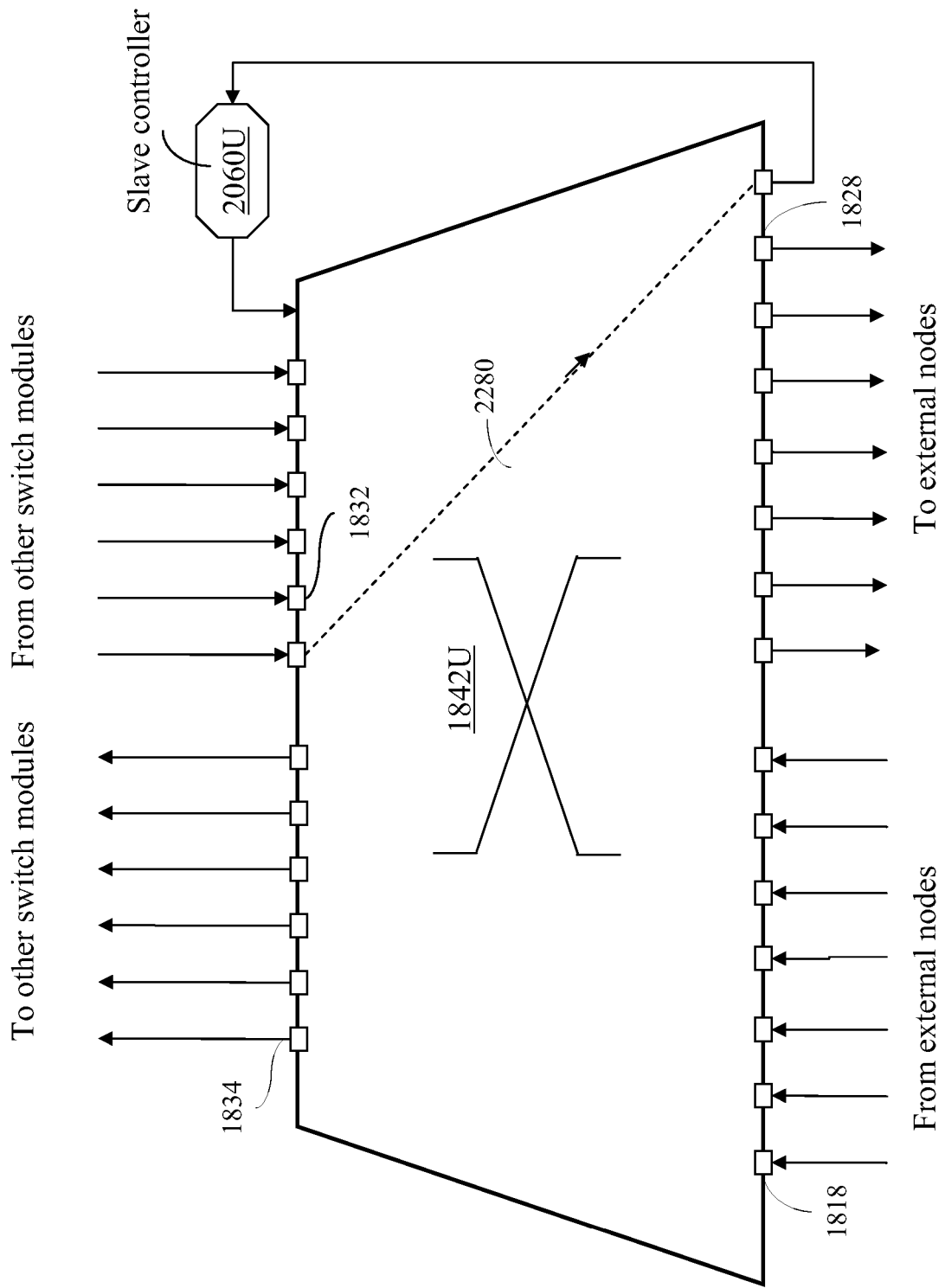
FIG. 22 illustrates a switch module in the switch of FIG. 19 adapted to receive control signals from the core controller of the switch module of FIG. 20, in accordance with an embodiment of the present invention.

FIG. 22 illustrates the control path in a switch module 1842U receiving control signals from core controller 2050A of FIG. 20. Inward port 1832 may receive both connectivity-control signals and payload signals. The connectivity-control signals are switched through the switch fabric of switch module 1842, as indicated by switched path 2280, to an outlet port 1828 connecting to a slave controller 2060U which controls the internal connectivity of the switch fabric of switch module 1842U.

Figure 23:
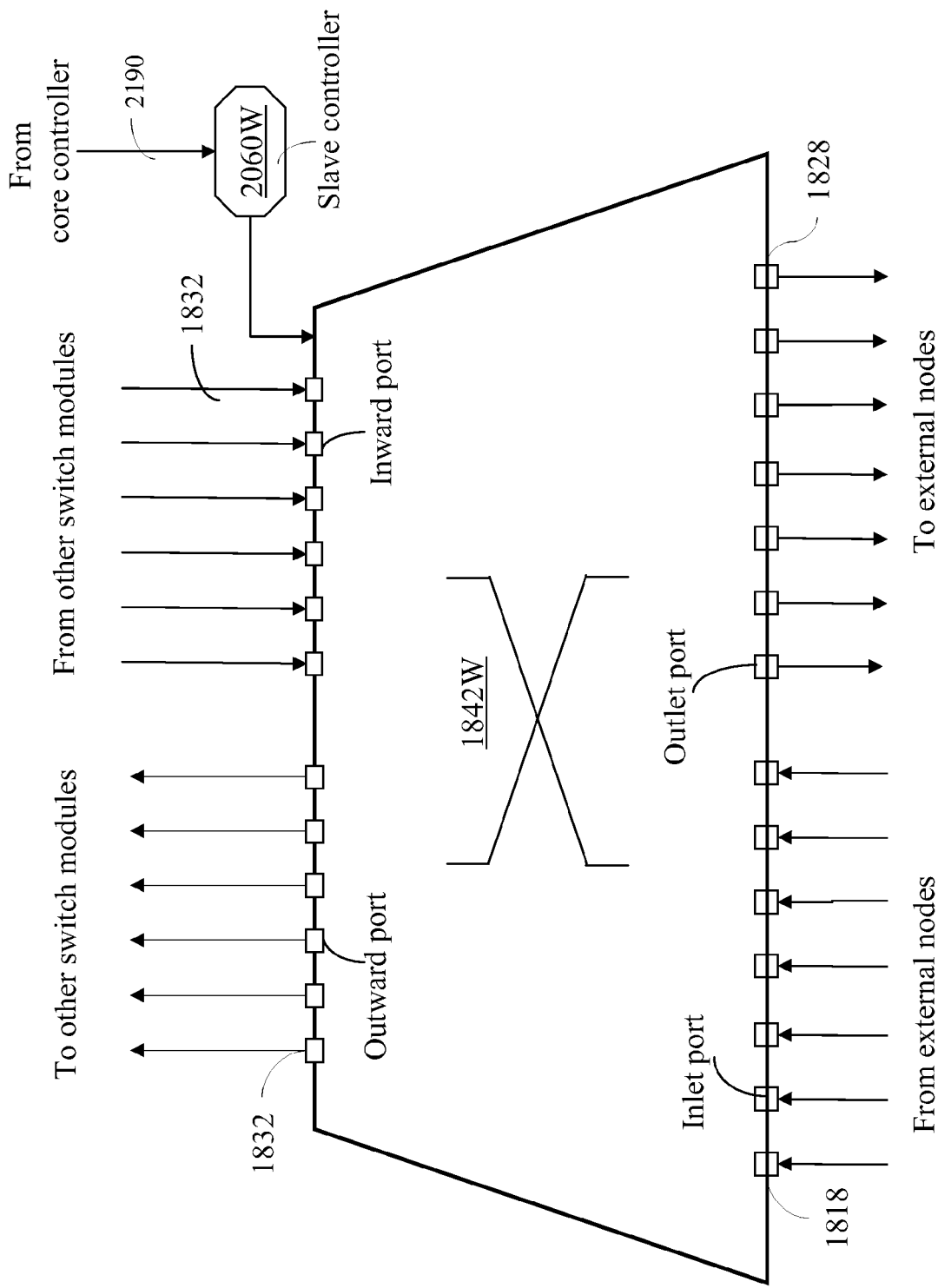
FIG. 23 illustrates a switch module in the switch of FIG. 19 adapted to receive control signals from the core controller of the switch module of FIG. 21, in accordance with an embodiment of the present invention.

FIG. 23 illustrates a direct control path 2190 from the core controller 2050B of FIG. 21 to the slave controller 2060W of a switch module 1842W. The core controller 2050B may connect directly to slave controllers of each switch module as indicated in FIG. 21 by direct control paths 2190.

Figure 24:
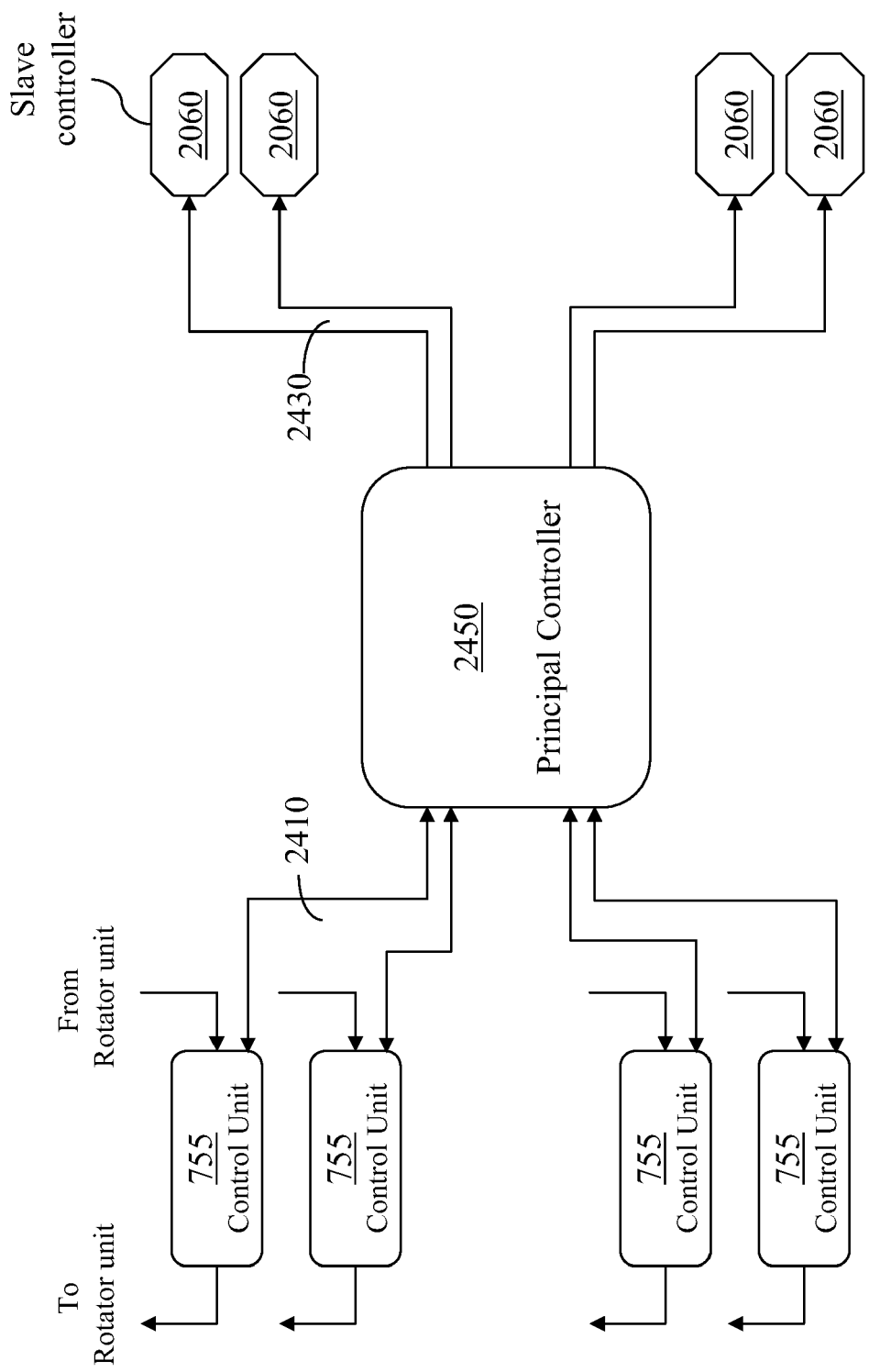
FIG. 24 illustrates an arrangement of interconnecting a core controller of the switch of FIG. 18 with control units associated with the rotator units and slave controllers associated with the switch modules, in accordance with an embodiment of the present invention.

Control signals may be sent by edge nodes directly through the rotator units 760 to a core controller as illustrated in FIG. 24. A control unit 755 associated with a rotator unit 760B (FIG. 7B) may receive and partially process the control signals and communicate with the core controller 2450. The core controller 2450 is herein called a principal controller to distinguish it from a core controller associated directly with a switch module 1842, such as core controller 2050A of FIG. 20 or 2150B of FIG. 21. FIG. 24 illustrates the interconnection of the principal controller 2450, control units 755 associated with rotator units 760, and the slave controllers 2060 of the switch modules 1842. Each control unit 755 has a bidirectional channel 2410 to principal controller 2450 and the principal controller 2450 has a one-way control channel 2430 to the slave controller 2060 of each switch module 1842. Other control paths may be provided for routine maintenance. The slave controller function is to configure the input-output connectivity of the switch fabric of a respective switch module. The slave controller operates under control of a core controller (or a principal controller).

Figure 25:
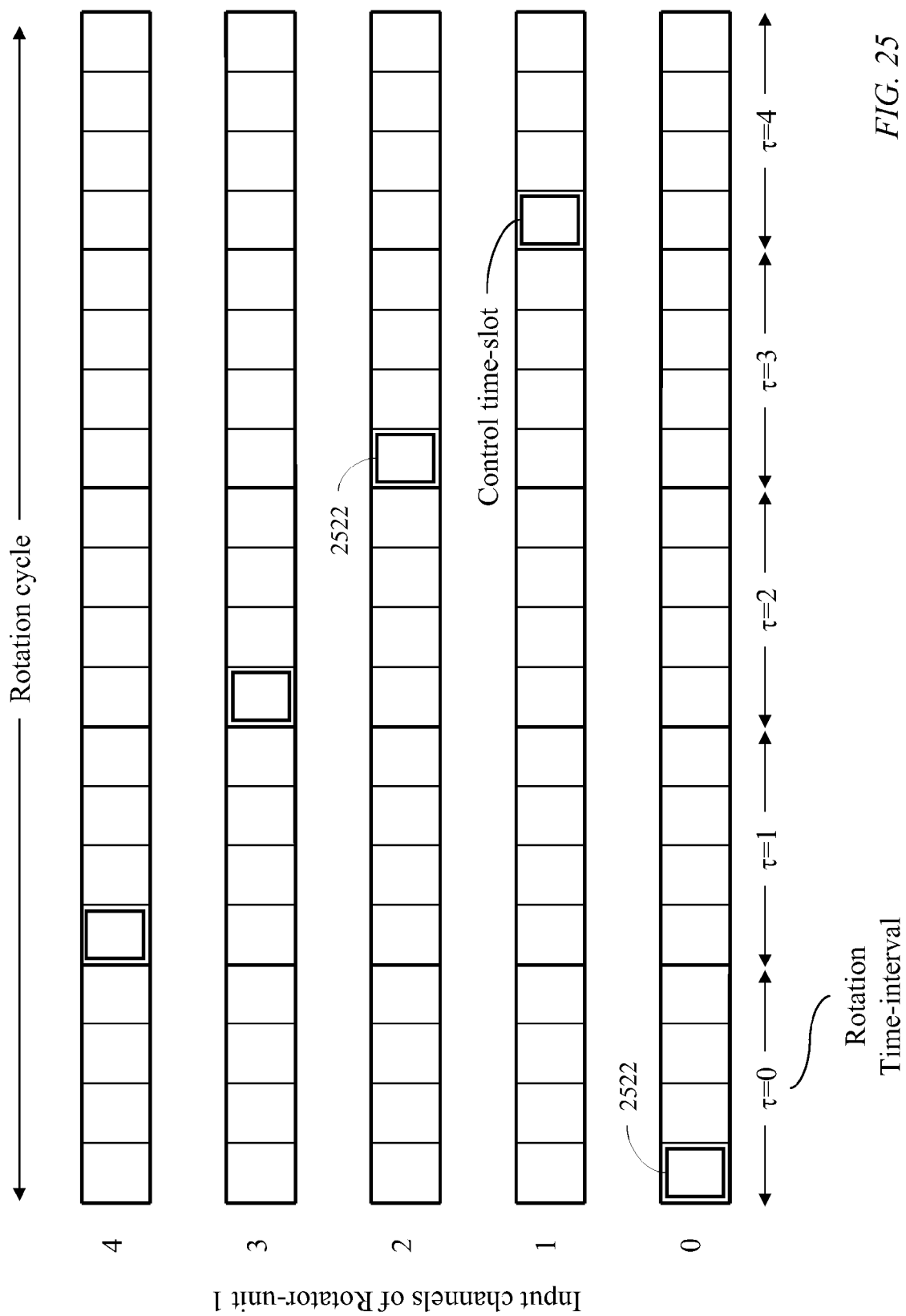
FIGS. 25 and 26 illustrate the timing of control time slots at the input of two rotator units, in accordance with an embodiment of the present invention.
Figure 26:
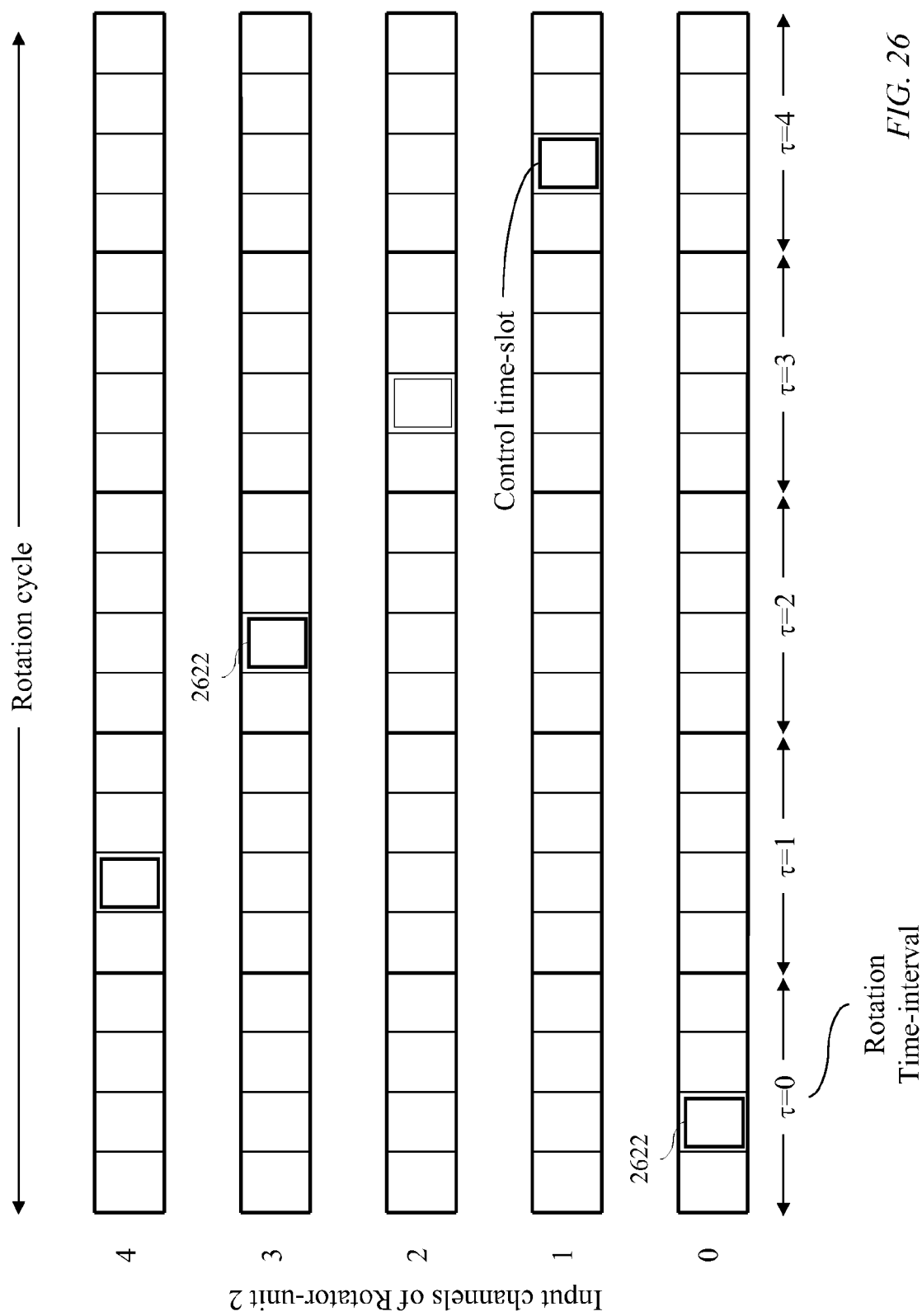
Figure 27:
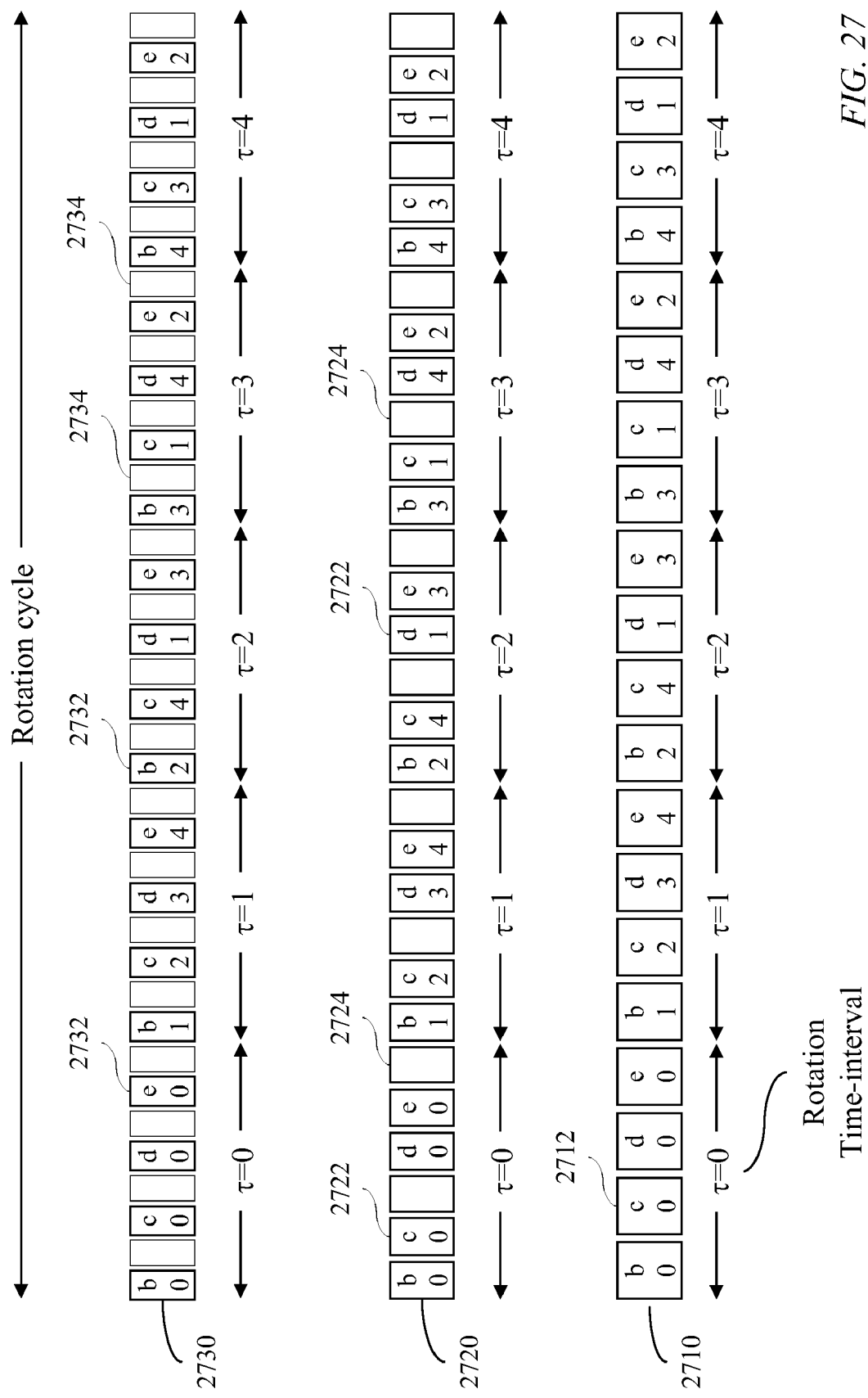
FIG. 27 illustrates the timing of the control time slots received at a core-node controller, for different values of the number of time-slots per rotation time-interval, in accordance with an embodiment of the present invention.

FIGS. 25-27 illustrate the division of a time frame into fine time slots, where each rotation time interval is divided into several fine time slots. Control signals from an edge node need not occupy a full rotation time interval. Instead, the control signals, together with other signals, may be directed to a switch module 1842 and control signals may be directed to the switch controller 2050. The fine time slots within each time interval may be switched to different outlet ports of the same switch module. The control signals transmitted by the edge nodes subtending to a rotator unit are staggered to be received consecutively by the control unit of the rotator unit.

FIG. 25 illustrates the staggering of control time slots in a time frame corresponding to a rotation cycle of the rotator units 760 used in the switching systems 1100 (FIG. 11) and 1900 (FIG. 19). The five rotator units 760-0 to 760-4 are identical, each having five output ports. The number of rotation intervals equals the number J (J=5) of output ports of a rotator unit. The rotation cycle has five time intervals ($\tau=0$ to $\tau=4$). Each rotation time interval may comprise an arbitrary number $v \leqq 1$ of time slots; four time slots in this example. The maximum number of rotator units is the number of output ports per rotator unit. The rotator units 760 preferably have different rotation shifts ranging from 0 to (J−1) as described with reference to FIGS. 10 and 16. A rotator unit of zero rotation shift is static, connecting each of its input channels to a fixed inlet port of a switch module, thus rendering the routing of control messages carried by its input channel to a core controller of the switching node difficult. Because of this difficulty, and considering the requirement that an internal expansion be provided to reduce or eliminate internal mismatch blocking, it is preferable that the static rotator unit 760-0 not be provided. This reduces the number of rotator units 760 to at most (J−1), allowing an internal expansion of at least the ratio J/(J−1). In general if the number, K (K>0) of rotator units is less than the number, J, of output ports per rotator unit, the internal expansion is J/K. When J is relatively large, over 61 for example, it may be preferable to provide less than (J−1) rotator units to permit a higher internal expansion. With J=61, for example, the internal expansion realized by omitting a single rotator unit is only 61/60. Providing 58 rotator units 760, the internal expansion becomes 61/58, providing an internal capacity that exceeds the external capacity by about 5%.

With, J=5, and with rotator unit 760-0 having a zero rotation shift omitted, an internal expansion of 1.25 (5 switch modules and 4 rotator units) is realized. FIG. 25 illustrates the use of a control time slot 2522 at each input channel to rotator unit 760-1, having a rotation shift of 1 and connecting to source nodes labeled b0 to b4 (FIG. 11), for conveying control signals from respective source nodes 612 to a core controller of the switching node. FIG. 26 illustrates the use of control time slots 2622 for conveying control time slots from edge nodes connecting to rotator unit 760-2, having a rotation shift of 2 and connecting to edge nodes labeled c0 to c4 (FIG. 11). None of the control time slots received at rotator unit 760-2 coincides with control time slots received at rotator unit 760-1. Likewise, rotator units 760-3 and 760-4 receive control signals during control time slots none of which coinciding with any other control time slot. It is noted that the switch modules are preferably bufferless and, hence, the control time slots are required to arrive at non-overlapping time slots.

Figure 16:
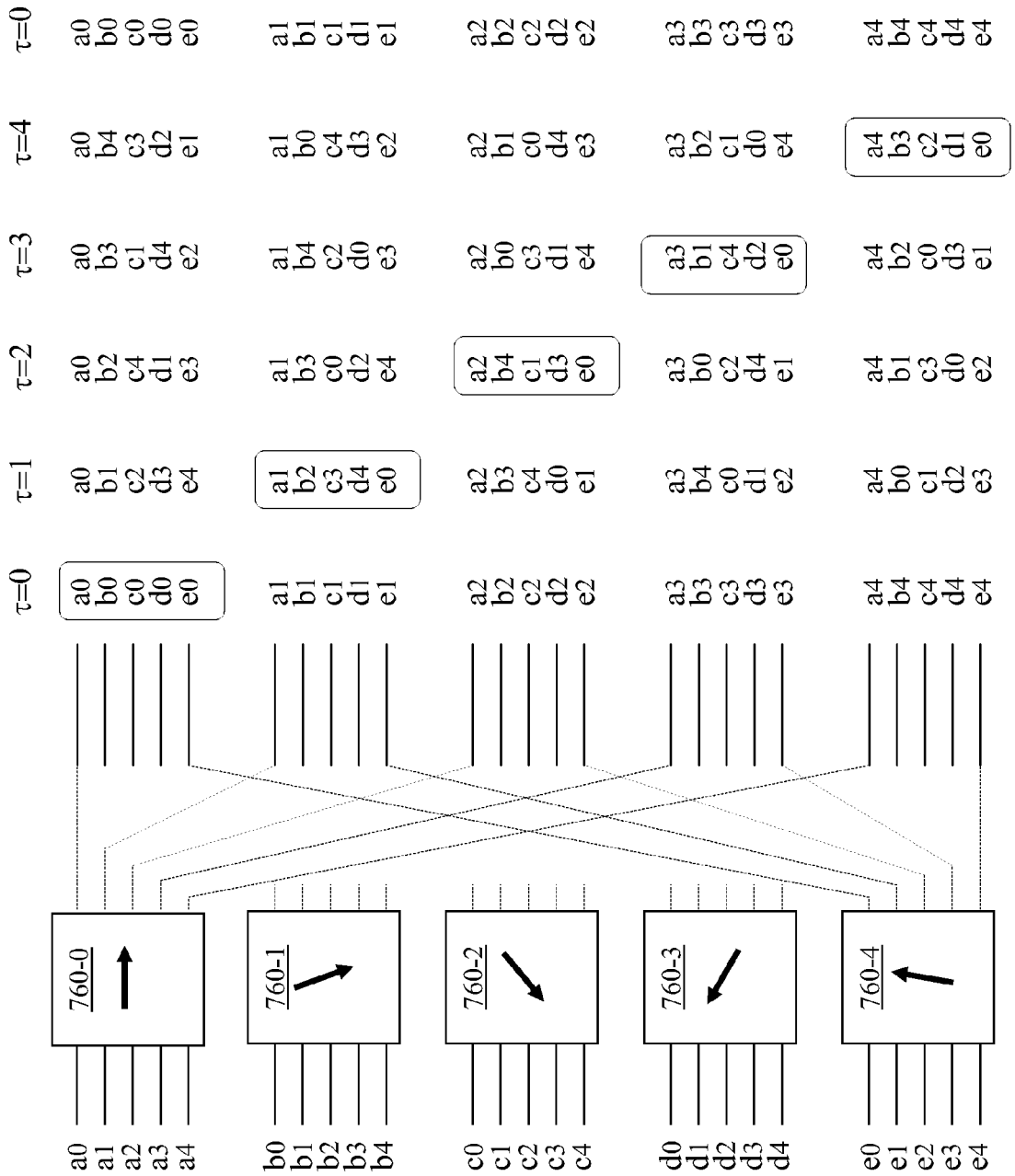
FIG. 16 illustrates the connectivity of the balanced connector of FIG. 10.

FIG. 27 illustrates the sequence of arrival of control time slots at core controller 2050A connected to switch module 1842A as illustrated in FIG. 20. Switch module 1842A is a particular one of the switch modules of the mesh structure of FIG. 18 or FIG. 19 that hosts a core controller. Recall that switch module 1842A receives signals from edge nodes labeled b0, c0, d0, and e0 during rotation time interval τ=0 as illustrated in FIG. 16 (with the omission of rotator unit 760-0, i.e., without input ports a0, a1, a2, a3, and a4). Switch module 1842A receives signals from edge nodes {b1, c2, d3, e4} during rotation time interval τ=1, from edge nodes {b2, c4, d1, e3} during rotation time interval τ=2, from edge nodes {b3, c1, d4, e2} during rotation time interval τ=3, and from edge nodes {b4, c3, d2, e1} during rotation time interval τ=4. During each rotation time interval, only a single time slot carries control signals from a respective edge node. The examples given in FIG. 27 include a case 2710 where the number of time slots 2712 per rotation interval is four (ν=4), thus the core controller receives a control signal from an input channel during each time slot in a time frame of 20 time slots. In case 2720, there are six time slots per rotation interval (ν=6) in a time frame of 30 time slots and a core controller receives control signals during 4 time slots 2722 in each rotation interval. The time slots carrying control signals would be interleaved by time slots 2724 that may carry other signals. In case 2730, a rotation interval includes eight time slots with four time slots 2732 used to carry control signals and four time slots 2734 may be used for other purposes.

A connection request specifies a source edge node, a sink edge node, and a number μ≧1 of time slots per time frame. The source edge node is uniquely identified by a rotator-unit number r (0≦r<J) and a relative input-port number p of the rotator unit r. The sink node is uniquely identified by a switch-unit number s (0≦r<J) and a relative outlet-port number q of the switch module s. Each source node may be paired with a sink node with which it shares memory and control, thus forming an integrated edge node. An edge node transmits signals through an input port of a rotator unit and receives signals from an outlet port of a switch module.

The invention, therefore, provides a high-capacity time-shared switch having an electronic core or a low-latency optical core. The structure of the switch is simpler and easier to control in comparison with prior-art designs.

Although the illustrated embodiments relate to a bufferless switch in which the switch fabric is preceded by a balanced connector as illustrated in FIG. 1, similar benefits can be realized by employing the configuration of FIG. 2 where a balanced connector succeeds the switch fabric.

In view of the description above, it will be understood by those of ordinary skill in the art that modifications and variations of the described and illustrated embodiments may be made within the scope of the inventive concepts. Moreover, while the invention is described in connection with various illustrative structures, those of ordinary skill in the art will recognize that the invention may be employed with other structures. Accordingly, the invention should not be viewed as limited except by the scope and spirit of the appended claims.

I claim:

1. A switching node comprising:
   a set of J switch modules, J>1, interconnected in a full mesh;
   a set of K rotators, 0<k<J, each rotator having an output channel to each switch module;
   a plurality of edge nodes each edge node having an inbound channel from a switch module and an outbound channel to a rotator; and
   a core controller interposed between an outward port of a selected switch module and an inward port of said selected switch module, said core controller having:
      a control path from each edge node of said plurality of edge nodes through a respective rotator and said selected switch module;
      a control path to each edge node having an inbound channel from said selected switch module through said selected switch module; and
      a control path to each edge node having an inbound channel from any switch module, other than said selected switch module, through said selected switch module and said any other switch module.

2. The switching node of claim 1 further comprising a rotator-connectivity controller coupled to said each rotator for determining an output port of said each rotator to which each input port of said each rotator connects during successive time intervals in a rotation cycle.

3. The switching node of claim 2 wherein said rotator-connectivity controller implements a static connectivity pattern of a rotator fabric of said each rotator.

4. The switching node of claim 2 wherein said rotator-connectivity controller implements a programmable connectivity pattern of a rotator fabric of said each rotator.

5. The switching node of claim 2 wherein J is a prime number and a rotator of index σ, 1≦σ≦K, having J input ports indexed as 0 to (J−1) and J output ports indexed as 0 to (J−1), is configured to connect an input port y, 0≦y<J, to an output port $(y+\tau \times \sigma)_{modulo\ J}$ during a time interval 0≦τ<J of a rotation cycle of J time intervals.

6. The switching node of claim 2 wherein each said successive time interval is divided into a number ν, of time slots, ν>1, to enable said each edge node to communicate with said core controller and with (ν−1) edge nodes having inbound channels from said selected switch module during said rotation cycle.

7. The switching node of claim 6 wherein said core controller receives control signals from said plurality of edge nodes during staggered upstream time slots and communicates control signals to said plurality of edge nodes during staggered downstream time slots.

8. The switching node of claim 6 further comprising a slave controller coupled to said each switch module for receiving instructions from said core controller and configuring connectivity of input ports to output ports of said each switch module during each time slot according to said instructions.

9. The switching node of claim 1 further comprising a slave controller connecting to an output port of a respective switch module among said J switch modules, other than said selected switch module, said slave controller receiving connectivity-control signals from said core controller through a channel connecting said selected switch module to said respective switch module and a switching fabric of said respective switch module.

10. The switching node of claim 1 further comprising a second core controller coupled to a switch module other than said selected switch module for control reliability and control-load sharing.

11. The switching node of claim 1 wherein the number K of rotators is selected so that a ratio J/K exceeds a predefined internal expansion of said each switch module.

12. A switching node comprising:
a set of J, J>1, switch modules interconnected in a full mesh;
a set of J slave controllers each coupled to a respective switch module for configuring connectivity of input ports of said respective switch module to output ports of said respective switch module;
a set of K rotators, 0<K<J, having K different rotation shifts varying from 1 to K, where a rotation shift of a specific rotator is defined as a constant difference between sequential numbers of output ports of the specific rotator to which an input port of the specific rotator connects during successive time intervals, said constant difference being specific to said specific rotator, each rotator having an output channel to each switch module;
a plurality of edge nodes each edge node having an inbound channel from a switch module and an outbound channel to a rotator; and
a core controller interposed between an outward port of a selected switch module and an inward port of said selected switch module, said core controller having J control channels, one to each of said J slave controllers.

13. The switching node of claim 12 further comprising a rotator-connectivity controller coupled to said each rotator for connecting each input port of said each rotator to output ports of said each rotator during successive time intervals according to a specified rotation shift of said each rotator.

14. The switching node of claim 12 wherein J is a prime number and a rotator of rotation shift $\sigma$, $1 \leq \sigma \leq K$, having J output ports indexed as 0 to (J−1), is configured to connect an input port of index y, $0 \leq y < J$, to an output port of index $(y+\tau \times \sigma)_{modulo\ J}$ during a time interval $0 \leq \tau < J$ of a rotation cycle of J time intervals.

15. The switching node of claim 12 having allocated control paths comprising:
a control path from each edge node of said plurality of edge nodes through a rotator and said selected switch module;
a control path to each edge node having an inbound channel from said selected switch module through said selected switch module; and
a control path to each edge node having an inbound channel from any switch module, other than said selected switch module, through said selected switch module and said any other switch module.

16. A switching node comprising:
a set of K+1 switch modules, K>1, interconnected in a full mesh;
a set of K+1 module-connectivity controllers each coupled to a respective switch module for configuring connectivity of input ports of said respective switch module to output ports of said respective switch module;
a principal controller having a channel to each module-connectivity controller;
a set of K rotators, each rotator having:
an output channel to each switch module;
a rotator-connectivity controller for implementing a predefined connectivity pattern specific to said each rotator; and
a control module interposed between an output port of said each rotator and an input port of said each rotator, and having a dual channel to said principal controller; and
a plurality of edge nodes each edge node having an inbound channel from a switch module and an outbound channel to a rotator;
wherein (K+1) is a prime number and a rotator of index $\sigma$, $1 \leq \sigma \leq K$, having (K+1) input ports indexed as 0 to K and (K+1) output ports indexed as 0 to K, is configured to connect an input port y, $0 \leq y \leq K$, to an output port $(y+\tau \times \sigma)_{modulo\ (K+1)}$ during a time interval $0 \leq \tau \leq K$ of a rotation cycle of (K+1) time intervals.

17. The switching node of claim 16 wherein said control module:
receives upstream control signals from edge nodes connecting to said each rotator;
transfers said upstream control signals to said principal controller;
receives downstream control signals from said principal controller; and
sends said downstream control signals to edge nodes through said switch modules.

18. The switching node of claim 16 wherein said time interval is divided into a number $\nu$, of time slots, $\nu>1$, to enable said each edge node to communicate with $\nu$ edge nodes of each switch module during said rotation cycle.

* * * * *